(12) United States Patent
Seo et al.

(10) Patent No.: US 11,921,540 B2
(45) Date of Patent: Mar. 5, 2024

(54) ELECTRONIC DEVICE AND METHOD FOR PERFORMING FAST TRANSITION BETWEEN SCREENS

(71) Applicant: Samsung Electronics Co., Ltd., Gyeonggi-do (KR)

(72) Inventors: Youngseung Seo, Gyeonggi-do (KR); Sangheon Kim, Gyeonggi-do (KR); Taeyong Moon, Gyeonggi-do (KR); Wooyoung Park, Gyeonggi-do (KR); Gisoo Lee, Gyeonggi-do (KR); Yeunwook Lim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 130 days.

(21) Appl. No.: 17/480,199

(22) Filed: Sep. 21, 2021

(65) Prior Publication Data

US 2022/0004225 A1    Jan. 6, 2022

Related U.S. Application Data

(63) Continuation of application No. 16/747,793, filed on Jan. 21, 2020, now Pat. No. 11,126,223.

(30) Foreign Application Priority Data

Apr. 17, 2019 (KR) ........................ 10-2019-0044942

(51) Int. Cl.
  *G06F 1/16* (2006.01)
  *G06F 3/14* (2006.01)

(52) U.S. Cl.
  CPC .......... *G06F 1/1616* (2013.01); *G06F 3/1423* (2013.01); *G06F 1/1601* (2013.01)

(58) Field of Classification Search
  CPC ..... G06F 1/1652; G06F 1/1681; G06F 1/1677
  See application file for complete search history.

(56) References Cited

U.S. PATENT DOCUMENTS 9,864,410 B2    1/2018  La et al.
2010/0182265 A1  7/2010  Kim et al.
(Continued)

FOREIGN PATENT DOCUMENTS

KR   10-2015-0026080 A   3/2015
WO   2016/017948 A1      2/2016

OTHER PUBLICATIONS

European Search Report dated Jan. 26, 2022.

*Primary Examiner* — Anthony Q Edwards
(74) *Attorney, Agent, or Firm* — Cha & Reiter, LLC

(57) ABSTRACT

An electronic device and method are disclosed. The device includes a foldable housing including a hinge connecting a first and second housing, a first bendable display, a second display oriented facing the first display, at least one sensor for detecting the bending, a memory and a processor. The processor implements the method, including: detecting bending by the sensor while displaying an application, determining to pre-generate another screen of the application based on the bending angle, pre-generating the second execution screen before the change in the angle is reaches a threshold value, and active a deactivated display and display the second execution screen on the activated display when the angle surpasses the predetermined threshold value.

18 Claims, 19 Drawing Sheets

(56) References Cited

U.S. PATENT DOCUMENTS

| | | | |
|---|---|---|---|
| 2013/0076591 A1* | 3/2013 | Sirpal | G06F 3/0486 |
| | | | 345/1.3 |
| 2013/0321340 A1 | 12/2013 | Seo et al. | |
| 2016/0034047 A1 | 2/2016 | Lee et al. | |
| 2016/0085319 A1 | 3/2016 | Kim et al. | |
| 2016/0132074 A1* | 5/2016 | Kim | G06F 1/1652 |
| | | | 345/173 |
| 2016/0371046 A1 | 12/2016 | Komiyama et al. | |
| 2017/0229100 A1 | 8/2017 | Chun et al. | |
| 2018/0188825 A1 | 7/2018 | Sutton | |
| 2018/0330694 A1* | 11/2018 | Klein | G06F 3/0487 |
| 2019/0012000 A1 | 1/2019 | Cavallaro et al. | |
| 2019/0310357 A1 | 10/2019 | Davis | |
| 2020/0133339 A1 | 4/2020 | Yildiz et al. | |
| 2020/0319674 A1 | 10/2020 | Knoppert | |
| 2021/0034107 A1 | 2/2021 | Therien et al. | |
| 2023/0221861 A1* | 7/2023 | Chen | G06F 3/0414 |
| | | | 345/173 |

* cited by examiner

ELECTRONIC DEVICE AND METHOD FOR PERFORMING FAST TRANSITION BETWEEN SCREENS

CROSS-REFERENCE TO RELATED APPLICATION(S)

This application is a Continuation of Ser. No. 16/747,793 filed on Jan. 21, 2020 based on and claims priority under 35 U.S.C. 119 to Korean Patent Application No. 10-2019-0044942, filed on Apr. 17, 2019, in the Korean Intellectual Property Office, the disclosure of which is herein incorporated by reference in its entirety.

BACKGROUND

1) Field

The disclosure relates to operation of multi-display regions, and, more particularly, to enabling faster transition between screen configurations in a foldable electronic device having multiple display regions.

2) Description of Related Art

Various electronic devices such as smart phones, tablet personal computers (PCs), portable multimedia players (PMPs), personal digital assistants (PDAs), laptop PCs, and wearable devices are used. Furthermore, electronic devices (e.g., foldable devices) having flexible and foldable characteristics, have been recently introduced to the market.

In recent years, there has been renewed research and development on foldable electronic devices, which include a housing that can be folded and unfolded about a hinge structure. The folding mechanism of these devices enable them to attain shapes and configurations that allow greater stowability in a folded state, while also having the advantage of increased display area in an unfolded state. Thus, foldable devices including flexible screens are predicted to increase in relevance as next generation devices which provide increased conveniences for users.

The above information is presented as background information only to assist with an understanding of the disclosure. No determination has been made, and no assertion is made, as to whether any of the above might be applicable as prior art with regard to the disclosure.

SUMMARY

The foldable devices may have different regions in which a screen is displayed, in both a folded state and an unfolded state. When the foldable device is changed (e.g., converted from the unfolded state to the folded state, or converted from the folded state to the unfolded state), a display region to be activated may be changed, and a screen to be displayed in the changed display region may be regenerated. A phenomenon may occur in these cases, in which a display operation of the screen is delayed, due to the delay time required for generation of the screen to be redisplayed. This delay of the display operation of the screen may result in inconvenience to a user.

An electronic device according to certain embodiments of the disclosure includes: a foldable housing including a hinge structure, a first housing structure connected to the hinge structure, and a second housing structure connected to the hinge structure and foldable about the hinge structure onto the first housing structure, a first display including a region bendable into a state in which the first housing structure and the second housing structure are folded onto each other, a second display disposed on the first housing structure and/or the second housing structure, and is oriented facing the first display, at least one sensor disposed in the foldable housing, the at least one sensor configured to detect a change in an angle between the first housing structure and the second housing structure, a processor disposed in the first housing structure or the second housing structure and operatively coupled to the first display, the second display, and the at least one sensor, and a memory that is operatively coupled to the processor, storing instructions, at least one application, context information relevant to the application, wherein the instructions are executable by the processor to cause the electronic device to: detect the change in the angle using the at least one sensor while displaying a first execution screen of the application on an activated display from among the first and second displays, determine whether to pre-generate a second execution screen of the application for display on a presently deactivated display from among the first and second displays, in response to detecting the change in the angle based at least in part on the context information, based on determining to pre-generate the second execution screen, pre-generating the second execution screen before the change in the angle is greater than or equal to a predetermined threshold value; and active the deactivated display and display the second execution screen on the activated display based on detecting that the change in the angle is greater than the predetermined threshold value.

An electronic device according to certain embodiments of the disclosure includes: a foldable housing including a hinge structure, a first housing structure connected to the hinge structure, and a second housing structure connected to the hinge structure and foldable about the hinge structure onto the first housing structure, a display including a region bendable into a state in which the first housing structure and the second housing structure are folded onto each other, at least one sensor disposed in the foldable housing and configured to detect a change in an angle between the first housing structure and the second housing structure, a processor disposed in the first housing structure or the second housing structure and operatively coupled to the display and the at least one sensor, and a memory that is operatively coupled to the processor, storing instructions, at least one application, and context information relevant to the application, and wherein the instructions are executable by the processor to cause the electronic device to: detect the change in the angle using the at least one sensor while displaying a first execution screen of the application on the display, in response to detecting the change in the angle, determine whether to pre-generate a second execution screen of the application for display on a partial region of the display based on the context information, based on determining to pre-generate the second execution screen, pre-generating the second execution screen before the change in the angle is greater than or equal to a predetermined threshold value, and display the second execution screen on the partial region in response to detecting that the change in the angle is greater than or equal to the predetermined threshold value.

An electronic device according to certain embodiments of the disclosure includes: a foldable housing including a hinge structure, a first housing structure connected to the hinge structure, and a second housing structure connected to the hinge structure foldable about the hinge structure onto the first housing structure, a first display including a region bendable into a state in which the first housing structure and the second housing structure are folded onto each other, a second display disposed on the first housing structure and/or the second housing structure and is oriented to facing the first display, at least one sensor disposed in the foldable housing, the at least one sensor configured to detect a change in an angle between the first housing structure and the second housing structure, a communication module configured to transceive with an external server, a processor disposed in the first housing structure or the second housing structure, operatively coupled to the first display, the second display, the at least one sensor, and the communication module, and a memory that is operatively coupled to the processor, storing instructions, wherein the instructions are executable by the processor to cause the electronic device to: receive at least a first piece of content of a first quality from the external server through the communication module, detect the change in the angle using the at least one sensor while outputting the received first piece of content, request a second piece of content having a second quality different from the first quality from the external server through the communication module in response to detecting that the change in the angle is greater than or equal to a predetermined threshold value, and output the second piece of the content having the second quality received from the external server.

A method of operating an electronic device according to certain embodiments of the disclosure includes: detecting, by at least one sensor, a change in an angle between a first housing structure and a second housing structure both connected to a hinge structure, when the second housing structure is folded about the hinge structure onto the first housing structure, wherein the change is detected while displaying a first execution screen of an application on a display, determining whether to pre-generate a second execution screen of the application to be displayed to the display in response to detecting the change based on a context information; based on determining to pre-generate the second execution screen, pre-generating the second execution screen prior to the change in the angle becoming greater than or equal to a predetermined threshold value, and displaying the second execution screen on the display based on detecting that the change in the angle is greater than or equal to the predetermined threshold value.

The electronic device and the method of operating the same according to certain embodiments of the disclosure can analyze context information, and determine whether or not to a second execution screen in advance on the basis of the context information. Therefore, a phenomenon that a display operation of the second execution screen is delayed according to the change in the state of the electronic device can be prevented.

The electronic device and the method of operating the same according to certain embodiments of the disclosure can control a quality of content displayed on the basis of a change in an angle between first housing structure and the second housing structure of the electronic device. Therefore, since the quality of content can be naturally controlled according to the change in the state of the electronic device, the seamless transition of the quality of content is made possible.

BRIEF DESCRIPTION OF THE DRAWINGS

For a more complete understanding of the disclosure and its advantages, reference is now made to the following description taken in conjunction with the accompanying drawings, in which like reference numerals represent like parts.

DETAILED DESCRIPTION

Figure 1:
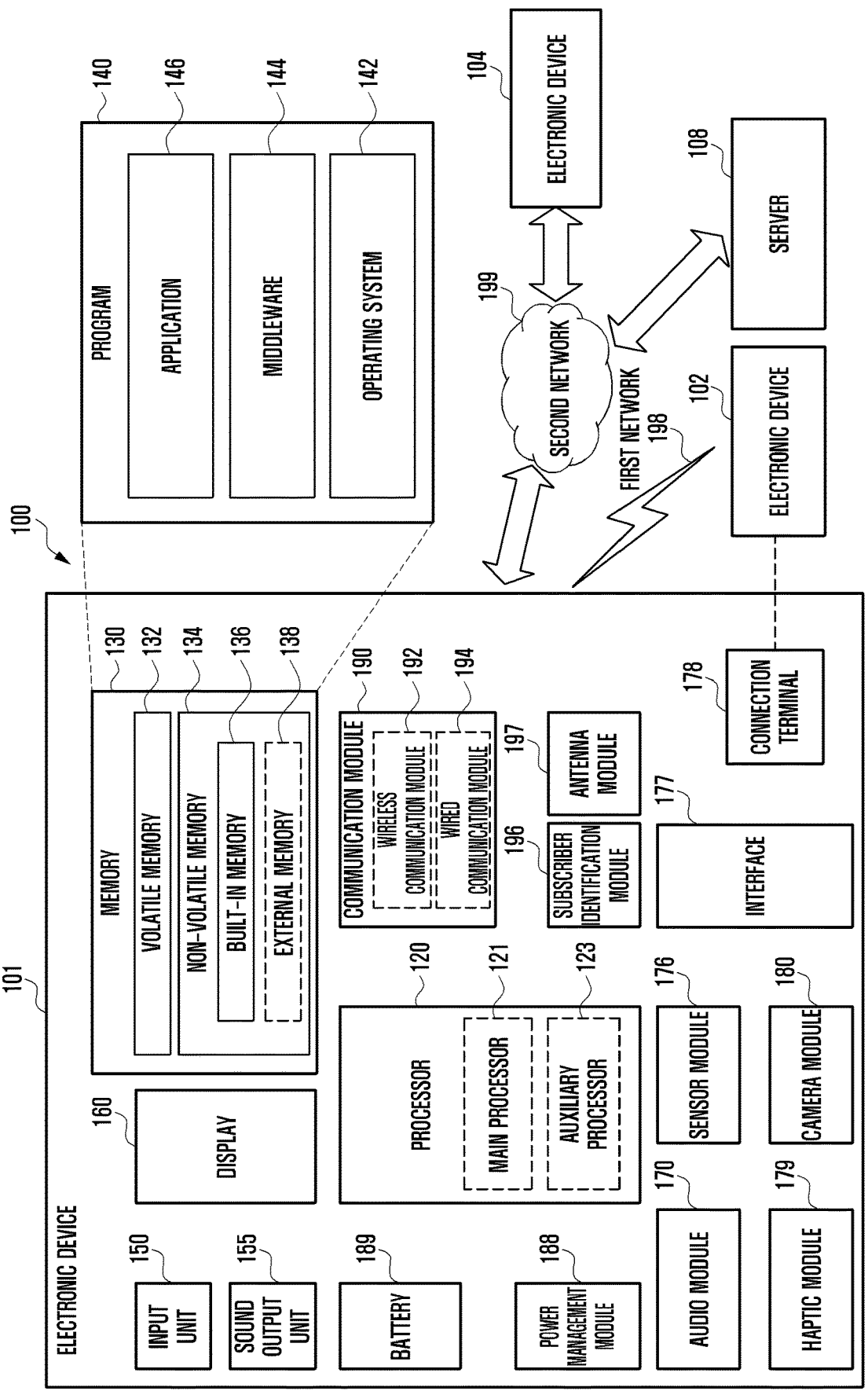
FIG. 1 is a block diagram of an electronic device according to certain embodiments of the disclosure.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an example embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an example embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element implemented using a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2A:
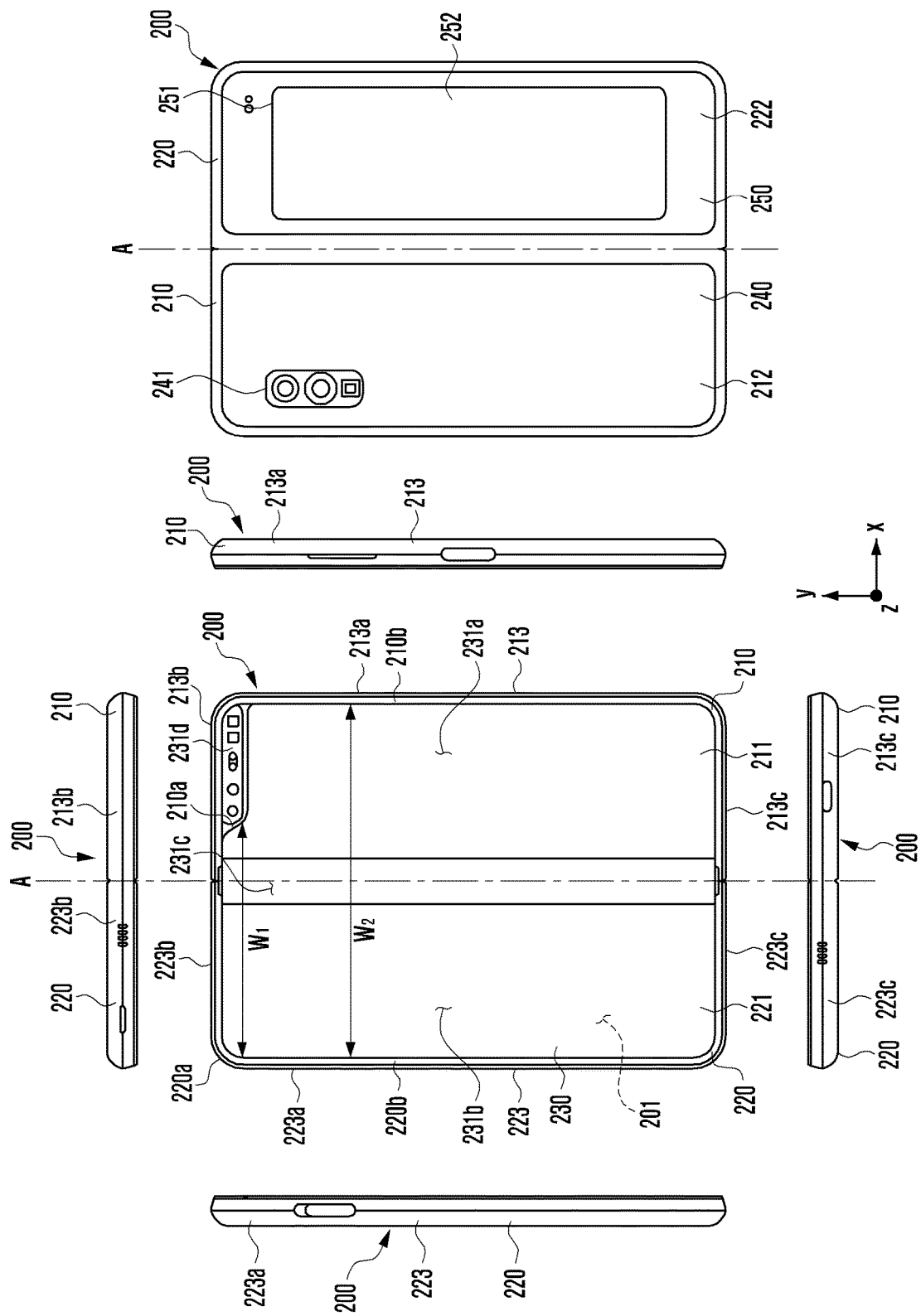
FIG. 2A is a view illustrating an unfolded state of the electronic device according to certain embodiments of the disclosure.
Figure 2B:
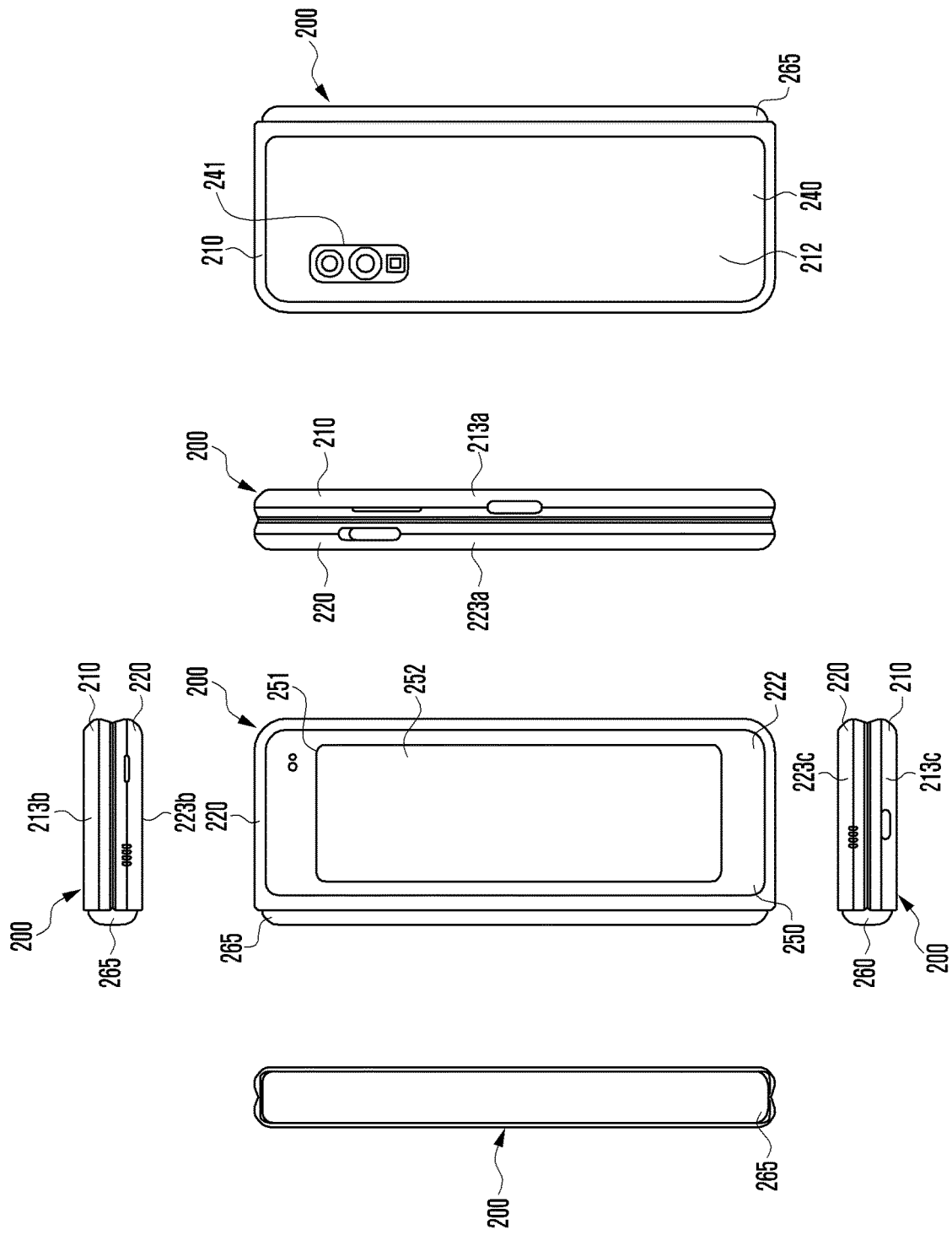
FIG. 2B is a view illustrating a folded state of the electronic device according to certain embodiments of the disclosure.

FIG. 2A is a diagram illustrating an example electronic device 200 in an unfolded state according to certain embodiments, and FIG. 2B is a diagram illustrating the electronic device 200 shown in FIG. 2A in a folded state according to certain embodiments.

The electronic device 200 in FIGS. 2A and 2B may be, at least in part, similar to the electronic device 101 in FIG. 1, or may include other embodiments of the electronic device.

Referring to FIG. 2A, the electronic device 200 may include a pair of housing structures 210 and 220 rotatably coupled to each other through a hinge, e.g., a hinge structure (e.g., a hinge structure 264 in FIG. 3) so as to be folded relative to each other, a hinge cover 265 covering a foldable portion of the pair of housing structures 210 and 220, and a display 230 (e.g., a flexible display or a foldable display) provided in a space formed by the pair of housing structures 210 and 220. The terms hinge and hinge structure may be used interchangeably herein. In this disclosure, a surface on which the display 230 is provided may be a front surface of the electronic device 200, and a surface opposite the front surface may be a rear surface of the electronic device 200. In addition, the surface surrounding the space between the front surface and the rear surface may be a side surface of the electronic device 200.

In an embodiment, the pair of housing structures 210 and 220 may include a first housing structure 210 including a sensor area 231*d*, a second housing structure 220, a first rear cover 240, and a second rear cover 250. The pair of housing structures 210 and 220 of the electronic device 200 is not limited to the shape and connection shown in FIGS. 2A and 2B, but may be implemented by combinations and/or connections of other shapes or components. For example, in another embodiment, the first housing structure 210 and the first rear cover 240 may be integrally formed, and the second housing structure 220 and the second rear cover 250 may be integrally formed.

According to an embodiment, the first housing structure 210 and the second housing structure 220 may be provided at both sides with respect to a folding axis (an axis A), and may have shapes that are symmetric overall with respect to the folding axis (the axis A). According to an embodiment, an angle or a distance between the first housing structure 210 and the second housing structure 220 may vary depending on whether the electronic device 200 is in an unfolded state, an folded state, or an intermediate state. According to an embodiment, unlike the second housing structure 220, the first housing structure 210 may further include a sensor area 231d in which various sensors are provided, but may be symmetric with the second housing structure 220 in the area other than the sensor area 231d. In another embodiment, the sensor area 231d may be further provided in or replaced with at least a portion of the second housing structure 220.

In an embodiment, the first housing structure 210 may be connected to a hinge structure (e.g., a hinge structure 264 in FIG. 3), and may have a first surface 211 provided to face the front surface of the electronic device 200 in an unfolded state of the electronic device 200, a second surface 212 directed in the direction opposite the first surface 211, and a first side member 213 surrounding at least a portion of the space between the first surface 211 and the second surface 212. In an embodiment, the first side member 213 may include a first side surface 213a provided in parallel to the folding axis (the axis A), a second side surface 213b extending from one end of the first side surface 213a in the direction perpendicular to the folding axis, the third side surface 213c extending from the opposite end of the first side surface 213a in the direction perpendicular to the folding axis (the axis A).

In an embodiment, the second housing structure 220 may be connected to a hinge structure (e.g., a hinge structure 264 in FIG. 3), and may have a third surface 221 provided to face the front surface of the electronic device 200 in an unfolded state of the electronic device 200, a fourth surface 222 directed in the direction opposite the third surface 221, and a second side member 220 surrounding at least a portion of the space between the third surface 221 and the fourth surface 222. In an embodiment, the second side member 220 may include a fourth side surface 223a provided in parallel to the folding axis (the axis A), a fifth side surface 223b extending from one end of the fourth side surface 223a in the direction perpendicular to the folding axis (the axis A), and a sixth side surface 223c extending from the opposite end of the fourth side surface 223a in the direction perpendicular to the folding axis (the axis A). In an embodiment, the third surface 221 may face the first surface 211 in a folded state.

In an embodiment, the electronic device 200 may include a recess 201 formed to receive a display 230 through structural shape coupling of the first housing structure 210 and the second housing structure 220. The recess 201 may have substantially the same size as the display 230. In an embodiment, the recess 201 may have two or more different widths in the direction perpendicular to the folding axis (the axis A) due to the sensor area 231d. For example, the recess 201 may have a first width (W1) between a first portion 220a parallel to the folding axis (the axis A) of the second housing structure 220 and a first portion 210a formed at the edge of the sensor area 231d of the first housing structure 210 and a second width (W2) between a second portion 220b of the second housing structure 210 and a second portion 210b that is parallel to the folding axis (the axis A) and does not belong to the sensor area 213d in the first housing structure 210. In this case, the second width (W2) may be greater than the first width (W1). For example, the recess 201 may be formed so as to have a first width (W1) from a first portion 210a of the first housing structure 210, which has an asymmetric shape, to a first portion 220a of the second housing structure 220 and a second width (W2) from the second portion 210b of the first housing structure 210, which has a symmetric shape, to the second portion 220b of the second housing structure 220. In an embodiment, the first portion 210a and the second portion 210b of the first housing structure 210 may be formed so as to have different distances from the folding axis (the axis A). The width of the recess 201 is not limited to the illustrated example. In certain embodiments, the recess 201 may have two or more different widths due to the shape of the sensor area 213d or the asymmetric shapes of the first housing structure 210 and the second housing structure 220.

In an embodiment, at least a portion of the first housing structure 210 and the second housing structure 220 may be made of a metallic or non-metallic material having a selected intensity of rigidity in order to support the display 230.

In an embodiment, the sensor area 231d may be provided adjacent to a corner of the first housing structure 210 so as to have a predetermined area. However, the arrangement, shape, or size of the sensor area 231d is not limited to the illustrated example. For example, in other embodiments, the sensor area 231d may be provided at another corner of the first housing structure 210 or in any area between the top and bottom corners. In another embodiment, the sensor area 231d may be provided in at least a portion of the second housing structure. In another embodiment, the sensor area 231d may be arranged to extend over the first housing structure 210 and the second housing structure 220. In an embodiment, the electronic device 200 may include components that are arranged to be exposed to the front surface of the electronic device 200 through the sensor area 213d or through one or more openings provided in the sensor area 231d, thereby executing various functions. In certain embodiments, the components may include at least one of, for example, a front camera device, a receiver, a proximity sensor, an illuminance sensor, an iris recognition sensor, an ultrasonic sensor, or an indicator.

In an embodiment, the first rear cover 240 may be provided on the second surface 212 of the first housing structure 210, and may have a substantially rectangular periphery. In an embodiment, at least a portion of the periphery may be wrapped by the first housing structure 210. Similarly, the second rear cover 250 may be provided on the fourth surface 222 of the second housing structure 220, and at least a portion of the periphery thereof may be wrapped by the second housing structure 220.

In the illustrated embodiment, the first rear cover 240 and the second rear cover 250 may be substantially symmetric with respect to the folding axis (the axis A). In another embodiment, the first rear cover 240 and the second rear cover 250 may have various shapes different from each other. In another embodiment, the first rear cover 240 may be integrally formed with the first housing structure 210, and the second rear cover 250 may be integrally formed with the second housing structure 220.

In an embodiment, the first rear cover 240, the second rear cover 250, the first housing structure 210, and the second housing structure 220 may be coupled to each other to provide a space to receive various components of the electronic device 200 (e.g., a printed circuit board, an antenna module, a sensor module, or a battery). In an embodiment, one or more components may be provided on the rear surface of the electronic device 200, or may be visually exposed therefrom. For example, one or more components or sensors may be visually exposed through a first rear area 241 of the first rear cover 240. In certain embodiments, the sensor may include a proximity sensor, a rear camera device, and/or a flash. In another embodiment, at least a portion of a sub-display 252 may be visually exposed through a second rear area 251 of the second rear cover 250.

The display 230 may be provided in a space formed by the foldable housing 210 and 220. For example, the display 230 may be placed in a recess (e.g., the recess 201 in FIG. 2A) formed by the pair of housing structures 210 and 220, and may be arranged so as to substantially occupy most of the front surface of the electronic device 200. Accordingly, the front surface of the electronic device 200 may include a display 230, a portion (e.g., an edge area) of the first housing structure 210 adjacent to the display 230, and a portion (e.g., an edge area) of the second housing structure 220. In an embodiment, the rear surface of the electronic device 200 may include a first rear cover 240, a portion (e.g., an edge area) of the first housing structure 210 adjacent to the first rear cover 240, a second rear cover 250, and a portion (e.g., an edge area) of the second housing structure 220 adjacent to the second rear cover 250.

In an embodiment, the display 230 may refer to a display of which at least a portion may be transformed into a flat or curved surface. In an embodiment, the display 230 may include a folding area 231c, a first area 231a provided at one side of the folding area 231c (e.g., at the right side of the folding area 231c), and a second area 231b provided at the opposite side of the folding area 231c (e.g., at the left side of the folding area 231c). For example, the first area 231a may be provided on the first surface 211 of the first housing structure 210, and the second area 231b may be provided on the third surface 221 of the second housing structure 220. In an embodiment, the division of the display 230 is illustrated as only an example, and the display 230 may be divided into a plurality of areas (e.g., two areas or four or more areas) according to the structure or functions thereof. Although the area of the display 230 may be divided with respect to the folding area 231c or the folding axis (the axis A) extending in parallel to the y-axis in the embodiment shown in FIG. 2A, the display 230 may be divided based on another folding area (e.g., a folding area parallel to the x-axis) or another folding axis (e.g., a folding axis parallel to the x-axis) in another embodiment. Even though the display is physically divided into several areas by the pair of housing structures 210 and 220 and the hinge structure (e.g., the hinge structure 264 in FIG. 3) as described above, the display 230 may substantially display a full screen through the pair of housing structures 210 and 220 and the hinge structure (e.g., the hinge structure 264 in FIG. 3). In an embodiment, the first area 231a and the second area 231b may have a symmetric shape overall with respect to the folding area 231c. However, unlike the second area 231b, the first area 231a may include a notch area (e.g., a notch area 233 in FIG. 3) obtained by cutting an area corresponding to the sensor area 231d, but other portions of the first area 231a, excluding the notch area, may be symmetric with the second area 231b. For example, the first area 231a and the second area 231b may include portions having a symmetric shape and portions having an asymmetric shape.

Figure 3:
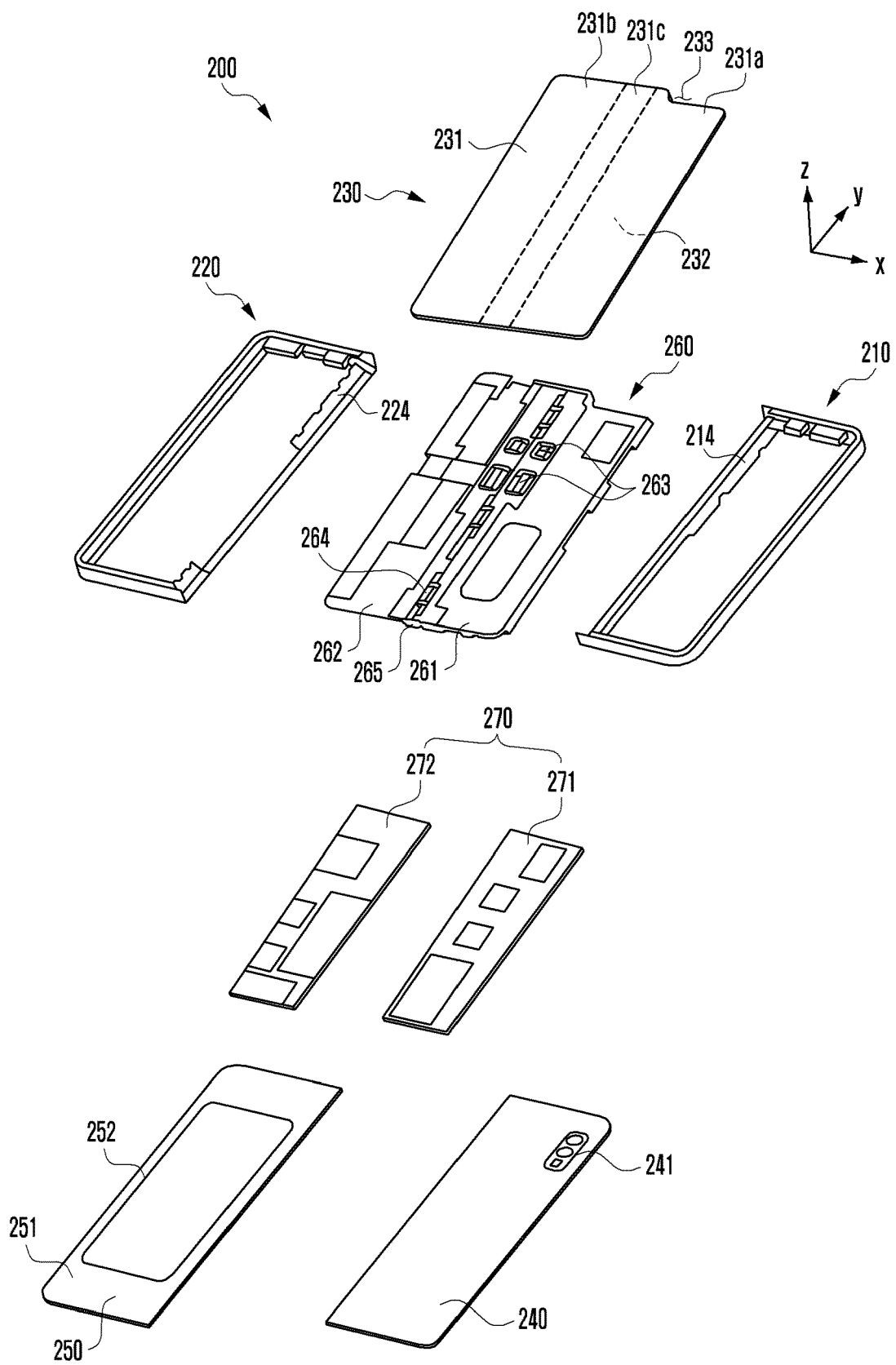
FIG. 3 is an exploded perspective view of the electronic device according to certain embodiments of the disclosure.

Referring to FIG. 2B, the hinge cover 265 is provided between the first housing structure 210 and the second housing structure 220 so as to cover internal components (e.g., the hinge structure 264 in FIG. 3). In an embodiment, the hinge cover 265 may be covered or exposed to the outside by a portion of the first housing structure 210 and the second housing structure 220 according to an operating state of the electronic device 200 (an unfolded state or a folded state).

For example, if the electronic device 200 is in an unfolded state as shown in FIG. 2A, the hinge cover 265 may be covered by the first housing structure 210 and the second housing structure 220 so as not to be exposed. For example, if the electronic device 200 is in a folded state (e.g., a completely folded state) as shown in FIG. 2B, the hinge cover 265 may be exposed to the outside between the first housing structure 210 and the second housing structure 220. For example, if the electronic device 200 is in an intermediate state in which the first housing structure 210 and the second housing structure 220 are folded at a certain angle, a portion of the hinge cover 265 may be exposed to the outside of the electronic device 200 between the first housing structure 210 and the second housing structure 220. In this case, the exposed area may be smaller than that in the fully folded state. In an embodiment, the hinge cover 265 may include a curved surface.

Hereinafter, the operation of the first housing structure 210 and the second housing structure 220 and respective areas of the display 230 according to the operating state of the electronic device 200 (e.g., an unfolded state and a folded state) will be described.

In an embodiment, if the electronic device 200 is in an unfolded state (e.g., the state shown in FIG. 2A), the first housing structure 210 and the second housing structure 220 are at an angle of 180 degrees with each other, and the first area 231a and the second area 231b of the display may be provided to be directed in the same direction. In addition, the folding area 231c may be on the same plane as the first area 231a and the second area 231b.

In an embodiment, if the electronic device 200 is in a folded state (e.g., the state shown in FIG. 2B), the first housing structure 210 and the second housing structure 220 may be arranged so as to face each other. The first area 231a and the second area 231b of the display 230 may face each other at a sharp angle (e.g., 0 degrees to 10 degrees). The folding area 231c may be configured, at least in part, as a curved surface having a predetermined curvature.

In an embodiment, if the electronic device 200 is in an intermediate state, the first housing structure 210 and the second housing structure 220 may be arranged at a certain angle with each other. The first area 231a and the second area 231b of the display 230 may be at an angle greater than the angle in the folded state and smaller than the angle in the unfolded state. The folding area 231c may be configured, at least in part, as a curved surface having a predetermined curvature, and the curvature may be smaller than the angle in the folded state.

FIG. 3 is an exploded perspective view illustrating an example electronic device 200 according to certain embodiments.

Referring to FIG. 3, in an embodiment, the electronic device 200 may include a display 230, a bracket assembly 260, one or more printed circuit boards 270, a first housing structure 210, a second housing structure 220, a first rear cover 240, and a second rear cover 250. In this disclosure, the display 230 may be referred to as a "display module" or a "display assembly".

The display 230 may include a display panel 231 (e.g., a flexible display panel) and one or more plates 232 or layers on which the display panel 231 is placed. In an embodiment, the plate 232 may be provided between the display panel 231 and the bracket assembly 260. A display panel 231 may be provided in at least a portion of one surface of the plate 232 (e.g., the surface directed in the z-direction in FIG. 3). The plate 232 may be formed in a shape corresponding to the display panel 231. For example, a portion of the plate 232 may be formed in a shape corresponding to the notch area 233 of the display panel 231.

The bracket assembly 260 may include a first bracket 261, a second bracket 262, a hinge structure 264 provided between the first bracket 261 and the second bracket 262, a hinge cover 265 covering the hinge structure 264 so as not to be viewed from the outside, and a wiring member 263 provided across the first bracket 261 and the second bracket 262 (e.g., a flexible printed circuit board (FPCB)).

In an embodiment, the bracket assembly 260 may be provided between the plate 232 and one or more printed circuit boards 270. For example, the first bracket 261 may be provided between the first area 231a of the display 230 and a first printed circuit board 271. The second bracket 262 may be provided between the second area 231b of the display 230 and a second printed circuit board 272.

In an embodiment, at least a portion of the wiring member 263 and the hinge structure 264 may be provided inside the bracket assembly 260. The wiring member 263 may be arranged in a direction crossing the first bracket 261 and the second bracket 262 (e.g., in the x-axis direction). The wiring member 263 may be arranged in a direction (e.g., the x-axis direction) perpendicular to a folding axis (e.g., the y-axis or the folding axis A in FIG. 1) of the folding area 231c.

One or more printed circuit boards 270 may include a first printed circuit board 271 provided on the side of the first bracket 261 and a second printed circuit board 272 provided on the side of the second bracket 262 as mentioned above. The first printed circuit board 271 and the second printed circuit board 272 may be provided in a space formed by the bracket assembly 260, the first housing structure 210, the second housing structure 220, the first rear cover 240, and the second rear cover 250. The first printed circuit board 271 and the second printed circuit board 272 may have components mounted thereon so as to implement various functions of the electronic device 200.

In an embodiment, the first housing structure 210 and the second housing structure 220 may be assembled so as to be coupled to both sides of the bracket assembly 260 in the state in which the display 230 is coupled to the bracket assembly 260. As described later, the first housing structure 210 and the second housing structure 220 may be coupled to the bracket assembly 260 by sliding on both sides of the bracket assembly 260.

In an embodiment, the first housing structure 210 may include a first rotary support surface 214, and the second housing structure 220 may include a second rotary support surface 224 corresponding to the first rotary support surface 214. The first rotary support surface 214 and the second rotary support surface 224 may include curved surfaces corresponding to curved surfaces provided in the hinge cover 265.

In an embodiment, if the electronic device 200 is in an unfolded state (e.g., the state shown in FIG. 2A), the first rotary support surface 214 and the second rotary support surface 224 may cover the hinge cover 265 so as to prevent the hinge cover 265 of the electronic device 200 from being exposed to the rear surface of the electronic device 200 to minimize and/or reduce the exposure thereof. In an embodiment, if the electronic device 200 is in a folded state (e.g., the state shown in FIG. 2B), the first rotary support surface 214 and the second rotary support surface 224 may rotate along curved surfaces provided in the hinge cover 265 so that the hinge cover 265 may be fully exposed to the rear surface of the electronic device 200.

Figure 4:
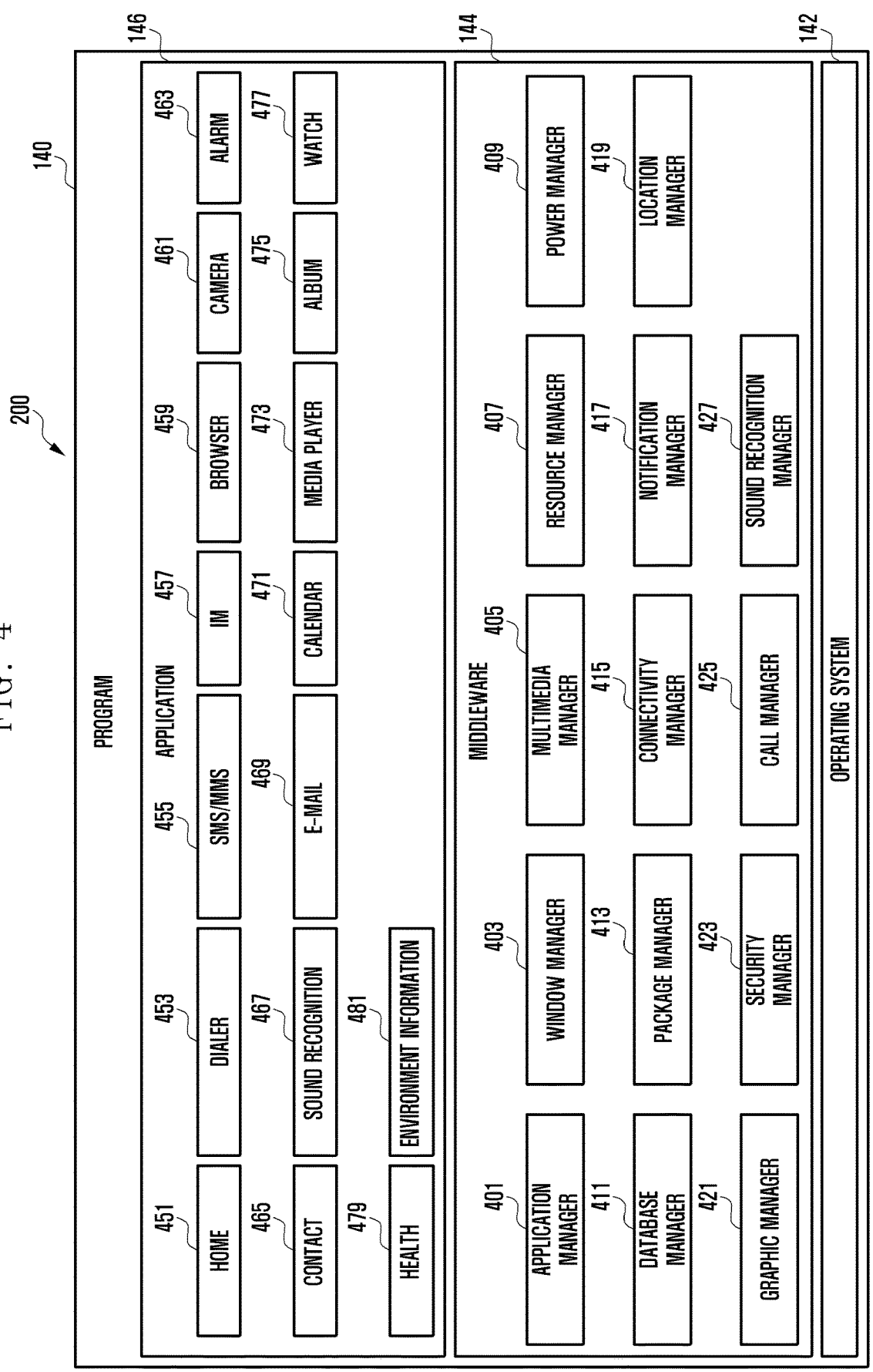
FIG. 4 is a block diagram of a program according to certain embodiments.

FIG. 4 is a block diagram 400 illustrating an example program 140 according to certain embodiments. According to an embodiment, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input device 150, the sound output device 155, the display device 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 401, a window manager 403, a multimedia manager 405, a resource manager 407, a power manager 409, a database manager 411, a package manager 413, a connectivity manager 415, a notification manager 417, a location manager 419, a graphic manager 421, a security manager 423, a call manager 425 (e.g., telephony manager), or a sound recognition manager 427 (e.g., a voice recognition manager).

The application manager 401, for example, may manage the life cycle of the application 146. The window manager 403, for example, may manage one or more graphical user interface (GUI) resources that are used on a screen. The multimedia manager 405, for example, may identify one or more formats to be used to play media files, and may encode or decode a corresponding one of the media files using a codec appropriate for a corresponding format selected from the one or more formats. The resource manager 407, for example, may manage the source code of the application 146 or a memory space of the memory 130. The power manager 409, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 409 may interwork with a basic input/output system (BIOS) (not shown) of the electronic device 101.

The database manager 411, for example, may generate, search, or change a database to be used by the application 146. The package manager 413, for example, may manage installation or update of an application that is distributed in the form of a package file. The connectivity manager 415, for example, may manage a wireless connection or a direct connection between the electronic device 101 and the external electronic device. The notification manager 417, for example, may provide a function to notify a user of an occurrence of a specified event (e.g., an incoming call, message, or alert). The location manager 419, for example, may manage locational information on the electronic device 101. The graphic manager 421, for example, may manage one or more graphic effects to be offered to a user or a user interface related to the one or more graphic effects.

The security manager 423, for example, may provide system security or user authentication. The telephony manager 425, for example, may manage a voice call function or a video call function provided by the electronic device 101. The voice recognition manager 427, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 444 may dynamically delete some existing components or add new components. According to an embodiment, at least part of the middleware 144 may be included as part of the OS 142 or may be implemented as another software separate from the OS 142.

The application 146 may include, for example, a home 451, dialer 453, short message service (SMS)/multimedia messaging service (MMS) 455, instant message (IM) 457, browser 459, camera 461, alarm 463, contact 465, sound recognition 467 (e.g., voice recognition), email 469, calendar 471, media player 473, album 475, watch 477, health 479 (e.g., for measuring the degree of workout or biometric information, such as blood sugar), or environmental information 481 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 469) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, delete, or update of an application running on the external electronic device.

FIGS. 5A, 5B, 5C, 5D, 5E, 5F and FIG. 5G are diagrams illustrating examples of an unintended user input that may occur while an angle between a first housing structure and a second housing structure changes in an electronic device according to certain embodiments.

Referring to FIGS. 5A, 5B, 5C, 5D, 5E, and 5F, an electronic device 200 (e.g., the electronic device 101 in FIG. 1) according to certain embodiments may include a foldable housing 510, a first display 530, and a second display 540.

According to certain embodiments, the electronic device 200 may include a foldable housing 510. The foldable housing 510 may include a first housing structure 210 and a second housing structure 220, which are connected by a hinge (e.g., the hinge structure 264 in FIG. 3).

According to certain embodiments, the second housing structure 220 may be connected to the first housing structure 210 so as to be foldable. The first housing structure 210 and the second housing structure 220 may be foldable about a folding axis 520 (e.g., the folding axis (axis A) in FIG. 2A) extending in a first direction. The first housing structure 210 and the second housing structure 220 may be arranged to face each other in a folded state.

Figure 5A:
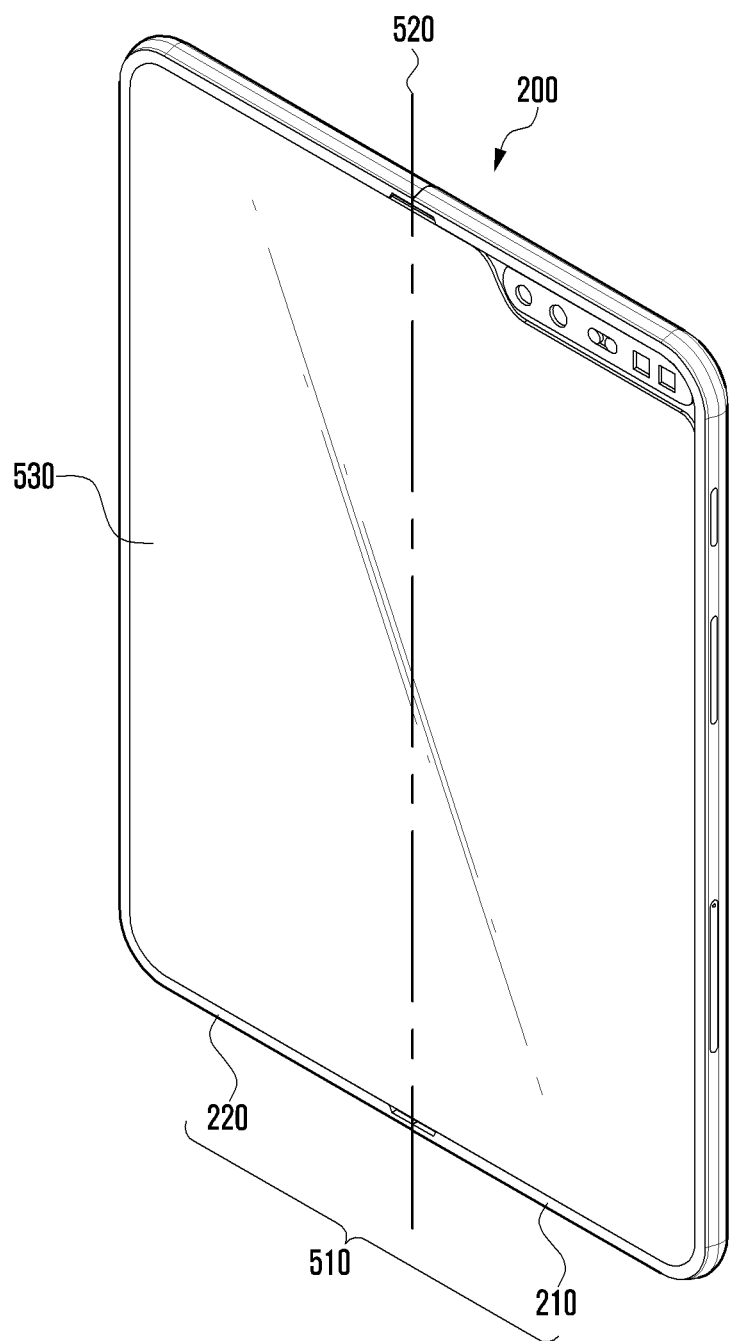
FIG. 5A is a diagram illustrating an example in which, in the electronic device according to certain embodiments of the disclosure, a transition of a screen displayed while the electronic device is folded or unfolded occurs.

Referring to FIG. 5A, the first housing structure 210 and the second housing structure 220 may be at an angle of 180 degrees. If the angle between the first housing structure 210 and the second housing structure 220 is equal to or greater than a predetermined angle, the electronic device 300 may be referred to as being in an unfolded state. The predetermined angle may be 180 degrees, but may vary according to the designer's intention. If the electronic device 200 is in an unfolded state, the first housing structure 210 and the second housing structure 220 may form a planar structure.

According to certain embodiments, the first display 530 (e.g., the display 230 in FIG. 2A) may be implemented as a single flexible display covering at least a portion of front surfaces of the first housing structure 210 and the second housing structure 220 (e.g., the first surface in FIG. 2A and the third surface 221 in FIG. 2A). The first display 530 may include a touch sensor for receiving a user touch input or a pressure sensor for receiving a pressure touch (or force touch) input of the user. While the electronic device 200 is in the folded state, one portion of the first display 530 implemented on the first housing structure 210 (e.g., the first area 231a in FIG. 2A) and the opposite portion of the first display 530 implemented on the second housing structure 220 (e.g., the second area 231b in FIG. 2A) may face each other. In an unfolded state of the electronic device 200, one portion of the first display 530 implemented on the first housing structure 210 and the opposite portion of the first display 530 implemented on the second housing structure 220 may form a plane. The first display 530 may include an area that is bent when folded or unfolded (e.g., the folding area 231c in FIG. 2A).

Figure 5B:
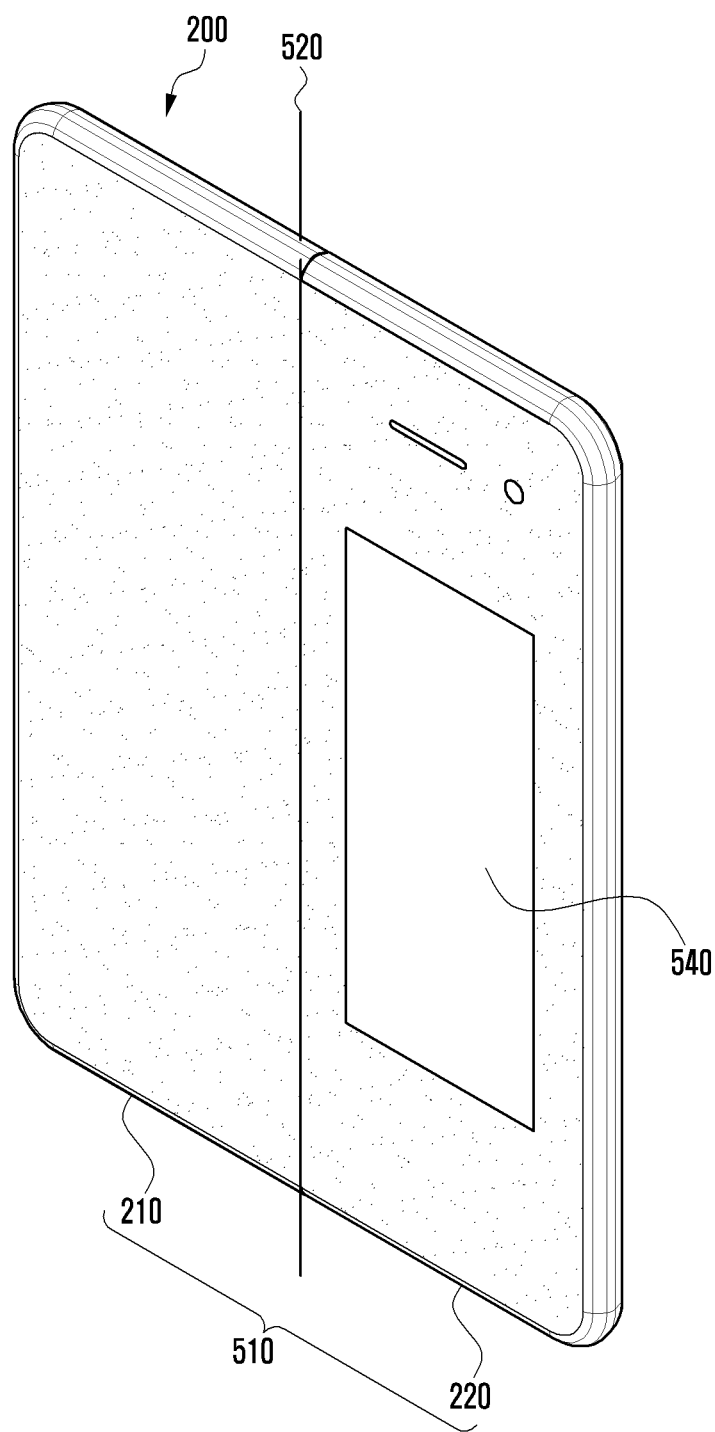
FIG. 5B is a diagram illustrating an example in which, in the electronic device according to certain embodiments of the disclosure, a transition of a screen displayed while the electronic device is folded or unfolded occurs.

Referring to FIG. 5B, the electronic device 200 according to certain embodiments may further include a second display 540 (e.g., the sub-display 252 in FIG. 2A). The second display 540 may be implemented on the surface other than the first display 530. For example, the first display 530 may be implemented on the front surface of the electronic device 200, and the second display may be implemented a second rear cover (e.g., the second rear cover 250 in FIG. 2A) provided on the rear surface thereof (e.g., the fourth surface 222 in FIG. 2A).

Figure 5C:
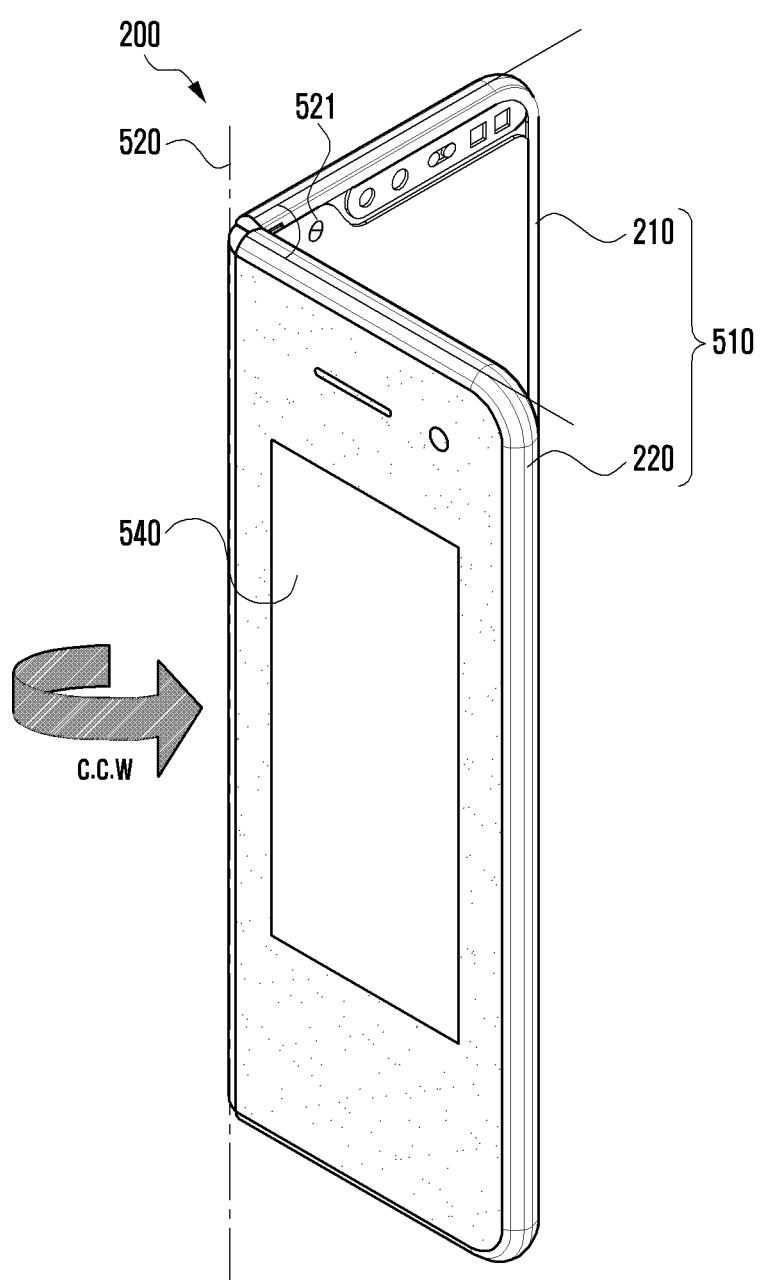
FIG. 5C is a diagram illustrating an example in which, in the electronic device according to certain embodiments of the disclosure, a transition of a screen displayed while the electronic device is folded or unfolded occurs.
Figure 5D:
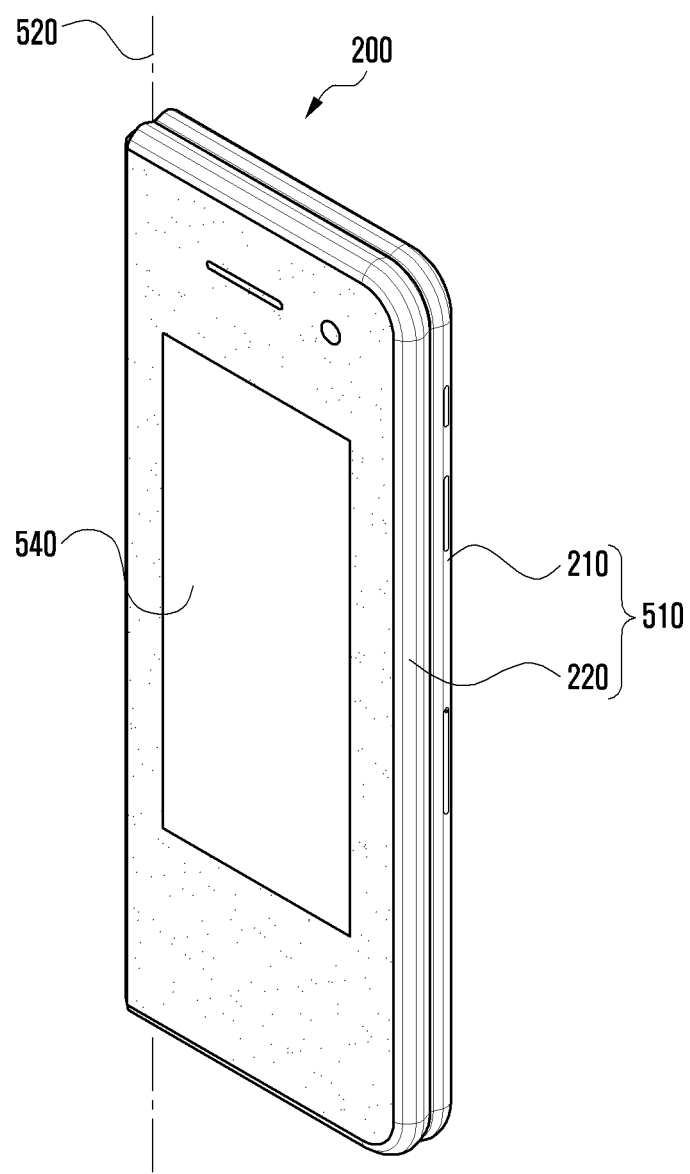
FIG. 5D is a diagram illustrating an example in which, in the electronic device according to certain embodiments of the disclosure, a transition of a screen displayed while the electronic device is folded or unfolded occurs.

FIG. 5C is a diagram illustrating an electronic device 200 that is folded in a counterclockwise (CCW) direction about a folding axis 520 according to certain embodiments. FIG. 5D is a diagram illustrating an example in which the electronic device 200 is fully folded about the folding axis 520 according to certain embodiments.

Referring to FIGS. 5C and 5D, a user of the electronic device 200 may fold the electronic device 200 in an unfolded state about the folding axis 520, or may unfold the electronic device 200 in a folded state about the folding axis 520 by applying force thereto.

Figure 5E:
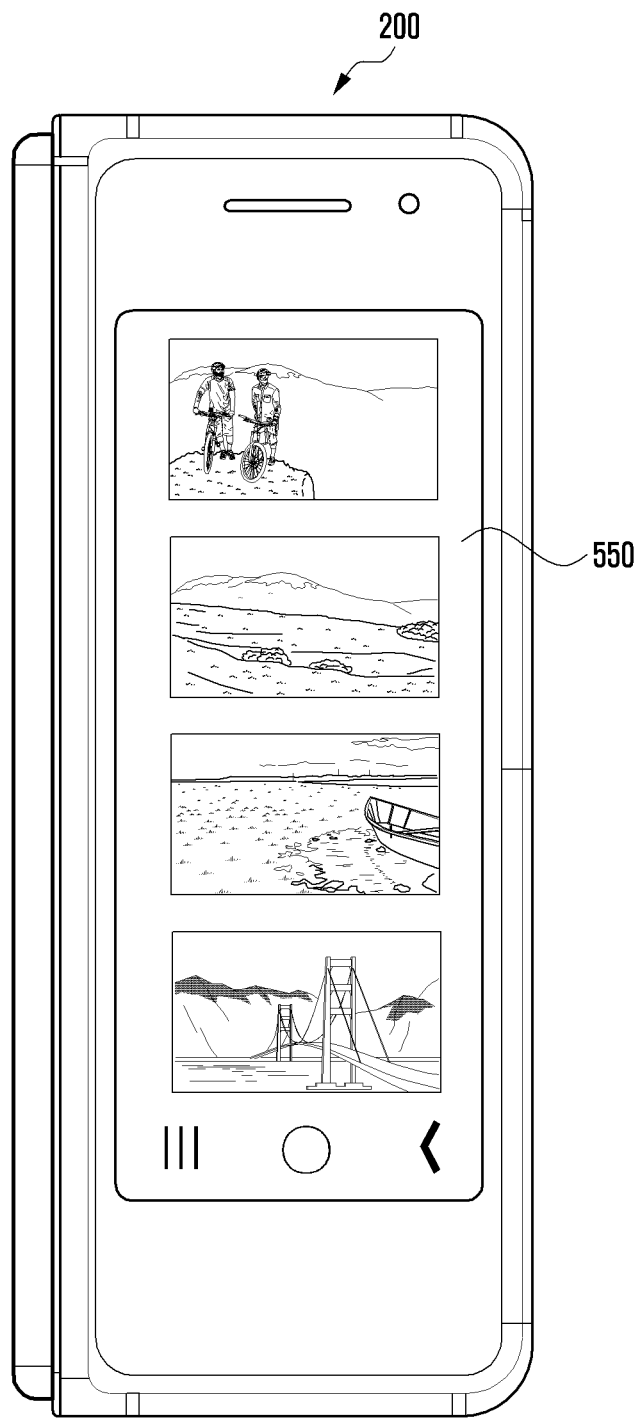
FIG. 5E is a diagram illustrating an example in which, in the electronic device according to certain embodiments of the disclosure, a transition of a screen displayed while the electronic device is folded or unfolded occurs.

The electronic device 200 according to certain embodiments of the disclosure may output various screens on the second display 540 in the state in which the electronic device 200 is folded (e.g., the electronic device 200 of FIG. 5D). For example, the electronic device 200 may display a first execution screen of the application that is being executed on the second display 540. Referring to FIG. 5E, the electronic device 200 may display a first execution screen 550 of the gallery application that is being executed on the second display 540. The first execution screen 550 may be an execution screen that includes thumbnails of images stored in the electronic device 200.

Figure 5F:
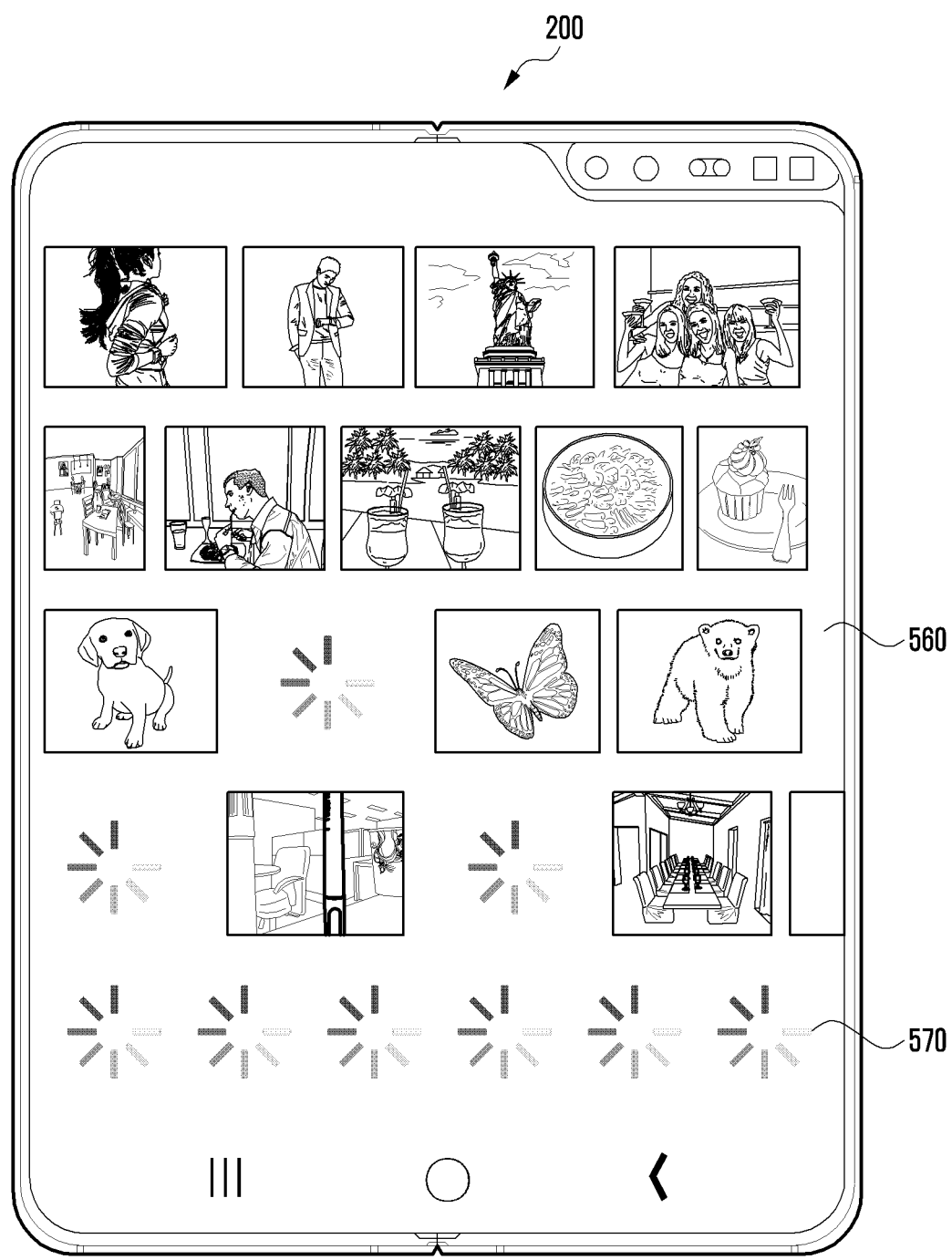
FIG. 5F is a diagram illustrating an example in which, in the electronic device according to certain embodiments of the disclosure, a transition of a screen displayed while the electronic device is folded or unfolded occurs.
Figure 5G:
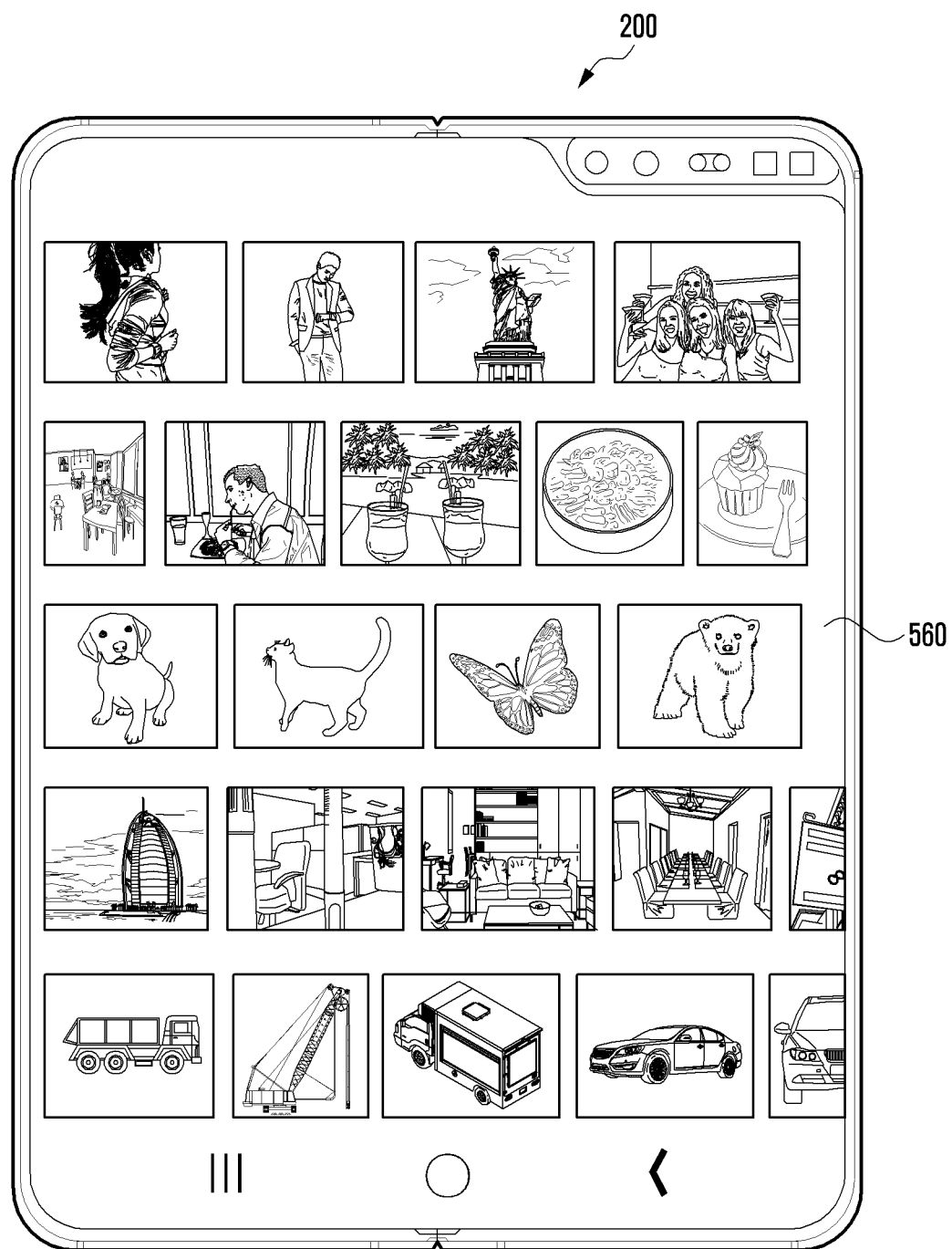
FIG. 5G is a diagram illustrating an example in which, in the electronic device according to certain embodiments of the disclosure, a transition of a screen displayed while the electronic device is folded or unfolded occurs.

The electronic device 200 according to certain embodiments of the disclosure may perform transition from a state in which a screen is displayed on the second display 540 to a state in which a screen is displayed on the first display 530, in response to detecting conversion from the folded state to the unfolded state. Referring to FIGS. 5F and 5G, the electronic device 200 may display a second execution screen 560 of the gallery application under execution on the first display 530. The second execution screen 560 may be an execution screen that includes thumbnails of images stored in the electronic device 200.

In a case where the electronic device 200 according to certain embodiments of the disclosure is converted from the folded state to the unfolded state or from the unfolded state to the folded state, the display on which various screens are displayed may be changed. For example, the electronic device 200 may display the second execution screen 560 on the first display 530 in response to detecting the conversion from the folded state to the unfolded state while displaying the first execution screen 550 on the second display 540.

According to certain embodiments of the disclosure, the first display 530 and the second display 540 may be different in size from each other. For example, the first display 530 may be larger than the second display 540. Since the sizes of the first display 530 and the second display 540 are different, in the case where the electronic device 200 is converted from the folded state to the unfolded state or from the unfolded state to the folded state, the electronic device 200 may regenerate the screen to be displayed. A time taken to regenerate the screen to be displayed may vary according to the characteristic of the application that is under execution at present. A situation in which a user should wait until the screen is displayed due to the time taken to regenerate the screen to be displayed may occur.

Referring to FIG. 5E, the electronic device 200 may display first execution screen 550 on the second display 540 in the folded state. The electronic device 200 may display the second execution screen 560 on the first display 530 in response to detecting the conversion from the folded state to the unfolded state. The number of pieces of content (e.g., preview images) included in the second execution screen 560 may be different from that included in the first execution screen 550, time may be taken to generate the second execution screen 560 while loading added content.

Referring to FIG. 5F, previews 570 of some images may not yet be displayed due to the time taken to generate the second execution screen 560. Accordingly, some thumbnail images may not be displayed during a time utilized, and previews 570 may be indicated in their place indicate they are being loaded. Referring to FIG. 5G, after the time utilized to generate the thumbnails has elapsed, the electronic device 200 may display the second execution screen 560, in which thumbnail previews of all images are included, on the first display 530.

According to certain embodiments of the disclosure, a phenomenon that a transition between screens is not smooth while the electronic device 200 is converted from the folded state to the unfolded state may occur. This phenomenon may cause a user a reduction in usefulness. Various examples capable of performing a smooth transition between screens will be described.

Figure 6:
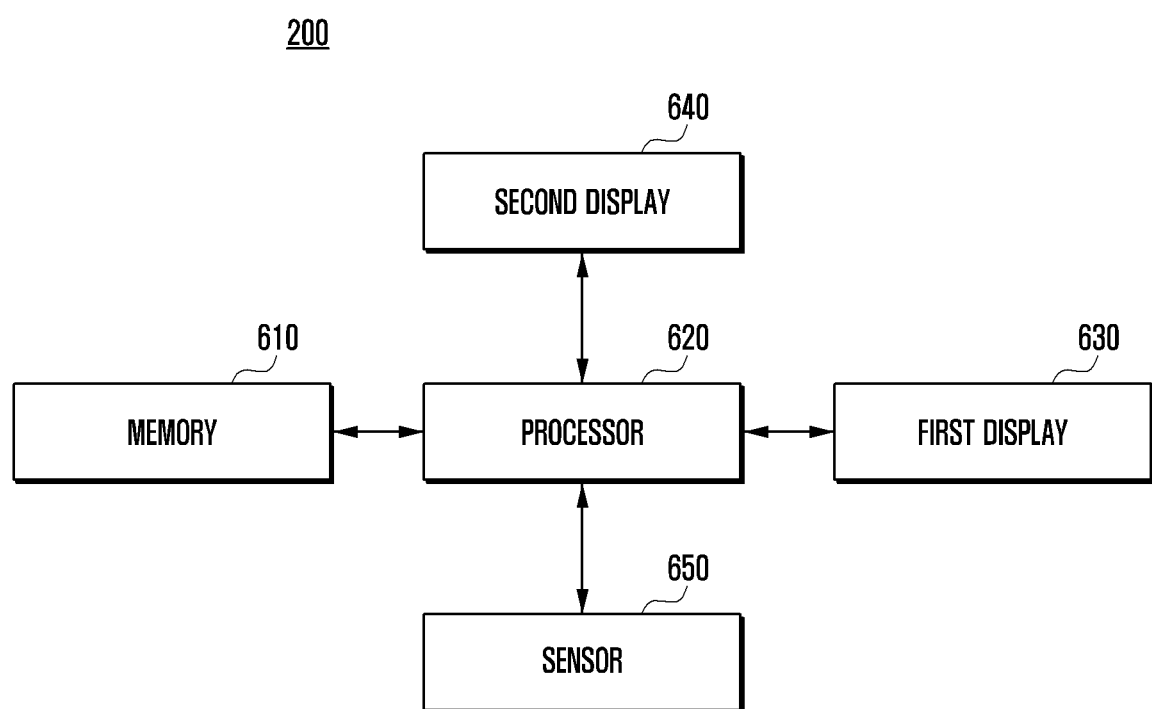
FIG. 6 is a block diagram of the electronic device according to certain embodiments of the disclosure.

FIG. 6 is a block diagram of the electronic device according to certain embodiments of the disclosure.

Referring to FIG. 6, the electronic device (e.g., the electronic device 200 of FIG. 2A) according to certain embodiments of the disclosure may include a memory 610 (e.g., the memory 130 of FIG. 1), a processor 620 (e.g., the processor 120 of FIG. 1), a first display 630 (e.g., the display 160 of FIG. 1 or the first display 530 of FIG. 5A), a second display 640 (e.g., the display 160 of FIG. 1 or the second display 540 of FIG. 5B), and a sensor 650.

According to certain embodiments of the disclosure, the first display 630 and the second display 640 may display various still or moving images on the basis of control of the processor 620. In the case where the electronic device 200 is in the unfolded state (e.g., the electronic device 200 of FIG. 5A), the processor 620 may display the various still or moving images on the first display 630. In the case where the electronic device 200 is in the folded state (e.g., the electronic device 200 of FIG. 5D), the processor 620 may display the various still or moving images on the second display 640.

According to certain embodiments of the disclosure, the first display 630 or the second display 640 may display a first execution screen (e.g., the first execution screen 550 of FIG. 5E) or a second execution screen (e.g., the second execution screen 560 of FIG. 5G). The first execution screen may refer to an execution screen of the application under execution which is displayed before the change in the state of the electronic device 200 (e.g., from the folded state to the unfolded state or from the unfolded state to the folded state). The second execution screen may refer to an execution screen of the application under execution which is displayed after the change in the state of the electronic device 200 (e.g., from the folded state to the unfolded state or from the unfolded state to the folded state). The second execution screen 560 may include content included in the first execution screen 550.

According to certain embodiments of the disclosure, the memory 610 may be operatively connected to the processor 620, and may store instructions for operating the processor 620. The processor 620 may perform various operations using the instructions stored in the memory 610. The memory 610 may temporarily or permanently store at least one application and context information relevant to the application.

According to certain embodiments of the disclosure, the processor 620 may detect a change in an angle between the first housing structure (e.g., the first housing structure 210 of FIG. 5A) and the second housing structure (e.g., the second housing structure 220 of FIG. 5A) while the first execution screen (e.g., the first execution screen 550 of FIG. 5E) of the application under execution is displayed. The change in the angle between the first housing structure 210 and the second housing structure 220 may be detected through various methods.

According to certain embodiments of the disclosure, the processor 620 may be operatively connected to the sensor 650 that measures the angle between the first housing structure 210 and the second housing structure 220 (e.g., the angle 521 of FIG. 5C). The processor 620 may detect the angle between the first housing structure 210 and the second housing structure 220 on the basis of data received from the sensor.

According to certain embodiments of the disclosure, the sensor 650 may include a sensor realized by various methods that can measure the angle 521 between the first housing structure 210 and the second housing structure 220.

According to certain embodiments of the disclosure, the processor 620 may detect the angle between the first housing structure 210 and the second housing structure 220 using at least one sensor 650 (e.g., a Hall sensor) that can detect a folding type of the electronic device 200 (e.g., a state in which the electronic device 200 is folded or a state in which the electronic device 200 is unfolded).

According to certain embodiments of the disclosure, the processor 620 may detect the angle between the first housing structure 210 and the second housing structure 220 using at least one sensor (a gyro sensor) 650 that can detect a motion of the electronic device 200.

According to certain embodiments of the disclosure, the processor 620 may determine whether or not to pre-generate the second execution screen to be displayed on the display to be activated on the basis of the context information in response to detecting the angle between the first housing structure 210 and the second housing structure 220.

According to certain embodiments of the disclosure, previously generating the second execution screen may refer to generating the second execution screen before the change in the state of the electronic device 200 (e.g., the conversion from the folded state to the unfolded state) is completed.

According to certain embodiments of the disclosure, the activated display may a display on which content is displayed according to the change in the state of the electronic device 200 (e.g., the change from the folded state to the unfolded state or the change from the unfolded state to the folded state). For example, in the case where the electronic device 200 is changed from the folded state to the unfolded state, the first display 630 may be the display to be activated. For another example, in the case where the electronic device 200 is changed from the unfolded state to the folded state, the second display 640 may be the display to be activated. The above examples may be applied to a case where the electronic device 200 is realized in an in-folding type. In a case where the electronic device 200 is realized in an out-folding type, the display to be activated may refer to a partial region of the first display 630.

According to certain embodiments of the disclosure, the context information may include information about the application that is under execution in the electronic device 200. The information about the application under execution may refer to a weighted value relevant to a time taken to generate the execution screens of the application under execution (e.g., the first execution screen 550 and the second execution screen 560). The processor 620 may determine whether or not to pre-generate the second execution screen on the basis of a weighted value corresponding to the application under execution.

According to certain embodiments of the disclosure, the processor 620 may configure weighted values for applications installed in the electronic device 200, and determine whether or not to pre-generate the second execution screen 560 on the basis of the weighted value corresponding to the application under execution. The processor 620 may measure a time taken to generate the second execution screen 560 with respect to each of the applications installed in the electronic device 200, and configure a weighted value in view of the measured time. For example, the processor 620 may configure a greater weighted value for the application in which the time taken to generate the second execution screen 560 is long than the application in which the time taken to generate the second execution screen 560 is relatively short. For another example, the processor 620 may configure a greater weighted value for the application in which a size of data to be processed to generate the second execution screen 560 is large than the application in which a size of data to be processed to generate the second execution screen 560 is relatively small. For yet another example, the processor 620 may configure a great weighted value for the application that has a big difference between the number of pieces of content to be included in the second execution screen 560 and the number of pieces of content included in the first execution screen 550.

According to certain embodiments of the disclosure, in a case where the weighted value corresponding to the application under execution is greater than or equal to (or exceeds) a previously configured value, the processor 620 may determine to pre-generate the second execution screen 560. In a case where the weighted value corresponding to the application under execution is smaller than (or smaller than or equal to) a previously configured value, the processor 620 may determine not to pre-generate the second execution screen 560.

According to certain embodiments of the disclosure, the context information may include a size which a task corresponding to the application under execution occupies on the memory 610. The task may refer to various jobs for performing a function which the application provides. The processor 620 may detect the size which the task occupies on the memory 610 in real time, and determine whether or not to pre-generate the second execution screen 560 on the basis of the size which the task occupies on the memory 610. For example, in a case where the size which the task occupies on the memory 610 is greater than or equal to a previously configured value, the processor 620 may determine to pre-generate the second execution screen 560. This is because, as the size which the task occupies on the memory 610 becomes greater, the time taken to generate the second execution screen 560 tends to increase.

According to certain embodiments of the disclosure, the context information may include information about the state of the electronic device 200. For example, the information about the state of the electronic device 200 may various pieces of information that include a state of a battery charge level of the electronic device 200, a state of communication of the electronic device 200, and information about the background applications that are under execution in the electronic device 200. In a case where the processor 620 detects the battery charge level, and the battery charge level is lower than or equal to a previously configured value, the processor 620 may determine not to pre-generate the second execution screen 560 for a reduction in battery consumption. In a case where the processor 620 detects the information about the background applications that are under execution in the electronic device 200, and a size which the background applications under execution occupy on the memory 610 is less than or equal to (or less than) a previously configured value, the processor 620 may determine to pre-generate the second execution screen 560.

According to certain embodiments of the disclosure, the processor 620 may pre-generate the second execution screen 560 in response to determining to pre-generate the second execution screen 560. The processor 620 may pre-generate the second execution screen 560 before the change in the state of the electronic device 200 (e.g., the conversion from the folded state to the unfolded state or the conversion from the unfolded state to the folded state) is completed.

According to certain embodiments of the disclosure, a process of determining to pre-generate the second execution screen 560 on the basis of the context information and a process of determining to generate the second execution screen 560 may be performed by a separate application installed in the memory 610. The application that performs the process of determining to generate the second execution screen 560 may refer to an application apart from the application corresponding to the first execution screen 550, and may be executed on a background. The application that determines to generate the second execution screen 560 may transmit an indicator that provides indication to pre-generate the second execution screen 560 to the application that is under execution at present in response to determining to pre-generate the second execution screen 560. The application that is under execution at present may receive the indicator to generate the second execution screen 560.

According to certain embodiments of the disclosure, the processor 620 may display the generated second execution screen 560 on the display to be activated in response to detecting that the change in the angle between the first housing structure 210 and the second housing structure 220 is greater than or equal to (or exceeds) a previously configured value.

According to certain embodiments of the disclosure, the previously configured value may refer to a value by which the display of the screen is converted from the first display 530 to the second display 540 or a value by which the display of the screen is converted from the second display 540 to the first display 530, and may be changed according to an intent of a designer.

According to certain embodiments of the disclosure, the processor 620 may perform transition from a state in which the first execution screen 550 is displayed on the second display 540 to a state in which the second execution screen 560 is displayed on the first display 530 in response to detecting that the electronic device 200 is converted from the folded state to the unfolded state.

According to certain embodiments of the disclosure, processor 620 may perform transition from a state in which the first execution screen 550 is displayed on the first display 530 to a state in which the second execution screen 560 is displayed on the second display 540 in response to detecting that the electronic device 200 is converted from the unfolded state to the folded state.

By previously generating the second execution screen 560 as in the processes described above, although the conversion of the state of the electronic device 200 (e.g., the conversion from the unfolded state to the folded state or the conversion from the folded state to the unfolded state) occurs, a time utilized until the displaying of the second execution screen 560 is started after the displaying of the first execution screen 550 is terminated can be minimized. By minimizing the time utilized until the displaying of the second execution screen 560 is started after the displaying of the first execution screen 550 is terminated, usefulness of the foldable device for a user can be increased.

According to certain embodiments of the disclosure, the processor 620 may determine not to pre-generate the second execution screen 560 on the basis of the context information. Determining not to pre-generate the second execution screen 560 may mean that a time taken to generate the second execution screen 560 of the application under execution is not long. In a case where the second execution screen 560 is not pre-generated, the processor 620 may generate the second execution screen 560 to display the generated second execution screen 560 in response to detecting that the change in the angle between the first housing structure 210 and the second housing structure 220 is greater than or equal to a previously configured value.

The example described above is given on the assumption that the electronic device 200 is realized in an in-folding type. However, the example described above may be applied to a case where the electronic device 200 is realized in an out-folding type.

In the case where the electronic device 200 is realized in the out-folding type, the electronic device 200 may include the first display 630, and may not include the second display 640. The electronic device 200 realized in the out-folding type may display the execution screen of the application under execution on the entire first display 630 in the unfolded state. The electronic device 200 realized in the out-folding type may display the execution screen of the application under execution in a partial region of the first display 630 in the folded state. In the electronic device 200 realized in the out-folding type, the processor 620 may determine whether or not to pre-generate the second execution screen to be displayed on the display to be activated on the basis of the context information in response to detecting the change in the angle between the first housing structure 210 and the second housing structure 220. The processor 620 may pre-generate the second execution screen in response to determining to pre-generate the second execution screen, and display the second execution screen in response to detecting that the change in the angle between the first housing structure 210 and the second housing structure 220 is greater than or equal to (or exceeds) a previously configured value. The processor 620 may check that the change in the angle between the first housing structure 210 and the second housing structure 220 is greater than or equal to (or exceeds) a previously configured value in response to determining not to pre-generate the second execution screen. The processor 620 may generate the second execution screen to display the generated second execution screen in response to detecting that the change in the angle between the first housing structure 210 and the second housing structure 220 is greater than or equal to (or exceeds) a previously configured value.

The electronic device according to certain embodiments of the disclosure may include: a foldable housing that includes a hinge structure, a first housing structure that is connected to the hinge structure, and a second housing structure that is connected to the hinge structure and is folded about the hinge structure onto the first housing structure; a first display that includes a region bent in a state in which the first housing structure and the second housing structure are folded onto each other; a second display that is disposed on the first housing structure and/or the second housing structure and is disposed to face the first display; at least one sensor that is disposed in the foldable housing and is configured to detect a change in an angle between the first housing structure and the second housing structure; a processor that is disposed in the first housing structure or the second housing structure and is operatively connected to the first display, the second display, and the at least one sensor; and a memory that is operatively connected to the processor. The memory may be configured to store at least one application and context information relevant to the application. When executed, the memory may store instructions to cause the processor to detect the change in the angle between the first housing structure and the second housing structure using the at least one sensor while displaying a first execution screen of the application under execution, to determine whether or not to pre-generate a second execution screen of the application which is to be displayed on a display to be activated in response to detecting the change in the angle on the basis of the context information, to pre-generate the second execution screen before the change in the angle is greater than or equal to a previously configured value in response to determining to generate the second execution screen, and to display the second execution screen on the activated display in response to detecting that the change in the angle is greater than or equal to a previously configured value.

In the electronic device according to certain embodiments of the disclosure, the instructions may be configured to cause the processor to determine not to pre-generate the second execution screen on the basis of the context information, to generate the second execution screen in response to detecting that the change in the angle is greater than or equal to a previously configured value, and to display the generated second execution screen on the first display.

In the electronic device according to certain embodiments of the disclosure, the instructions may be configured to cause the processor to complete the generation of the second execution screen until the change in the angle is greater than or equal to a previously configured value.

In the electronic device according to certain embodiments of the disclosure, the context information may include a size of data to be processed for execution of the application, and the instructions may be configured to cause the processor to determine whether or not to generate the second execution screen on the basis of the size of the data.

In the electronic device according to certain embodiments of the disclosure, the context information may include information about content to be included in the second execution screen, and the instructions may be configured to cause the processor to determine whether or not to generate the second execution screen on the basis of the information about the content.

In the electronic device according to certain embodiments of the disclosure, the memory may be configured to store a task for execution of the application, the context information may include a size which the task occupies on the memory, and the instructions may be configured to cause the processor to determine whether or not to generate the second execution screen on the basis of the size which the task occupies on the memory.

In the electronic device according to certain embodiments of the disclosure, the context information may include a time utilized to generate the second execution screen, and the instructions may be configured to cause the processor to determine whether or not to generate the second execution screen on the basis of the detected time.

In the electronic device according to certain embodiments of the disclosure, the first execution screen may some pieces of the content included in the second execution screen.

An electronic device according to certain embodiments of the disclosure includes: a foldable housing that includes a hinge structure, a first housing structure that is connected to the hinge structure, and a second housing structure that is connected to the hinge structure and is folded about the hinge structure onto the first housing structure; a display that includes a region bent in a state in which the first housing structure and the second housing structure are folded onto each other; at least one sensor that is disposed in the foldable housing and is configured to detect a change in an angle between the first housing structure and the second housing structure; a processor that is disposed in the first housing structure or the second housing structure and is operatively connected to the display and the at least one sensor; and a memory that is operatively connected to the processor. The memory is configured to store at least one application and context information relevant to the application. When executed, the memory stores instructions to cause the processor to detect the change in the angle between the first housing structure and the second housing structure using the at least one sensor while displaying a first execution screen of the application under execution on the display, to determine whether or not to pre-generate a second execution screen of the application which is to be displayed in a partial region of the display in response to detecting the change in the angle on the basis of the context information, to pre-generate the second execution screen before the change in the angle is greater than or equal to a previously configured value in response to determining to generate the second execution screen, and to display the second execution screen on the partial region in response to detecting that the change in the angle is greater than or equal to a previously configured value.

In the electronic device according to certain embodiments of the disclosure, the instructions may be configured to cause the processor to display no screens in a region other than the partial region.

In the electronic device according to certain embodiments of the disclosure, the context information may include a size of data to be processed for execution of the application, and the instructions may be configured to cause the processor to determine whether or not to generate the second execution screen on the basis of the size of the data.

In the electronic device according to certain embodiments of the disclosure, the context information may include information about content to be included in the second execution screen, and the instructions may be configured to cause the processor to determine whether or not to generate the second execution screen on the basis of the information about the content.

In the electronic device according to certain embodiments of the disclosure, the memory may be configured to store a task for execution of the application, the context information may include a size which the task occupies on the memory, and the instructions may be configured to cause the processor to determine whether or not to generate the second execution screen on the basis of the size which the task occupies on the memory.

In the electronic device according to certain embodiments of the disclosure, the second execution screen may include some pieces of the content included in the first execution screen.

Figure 7:
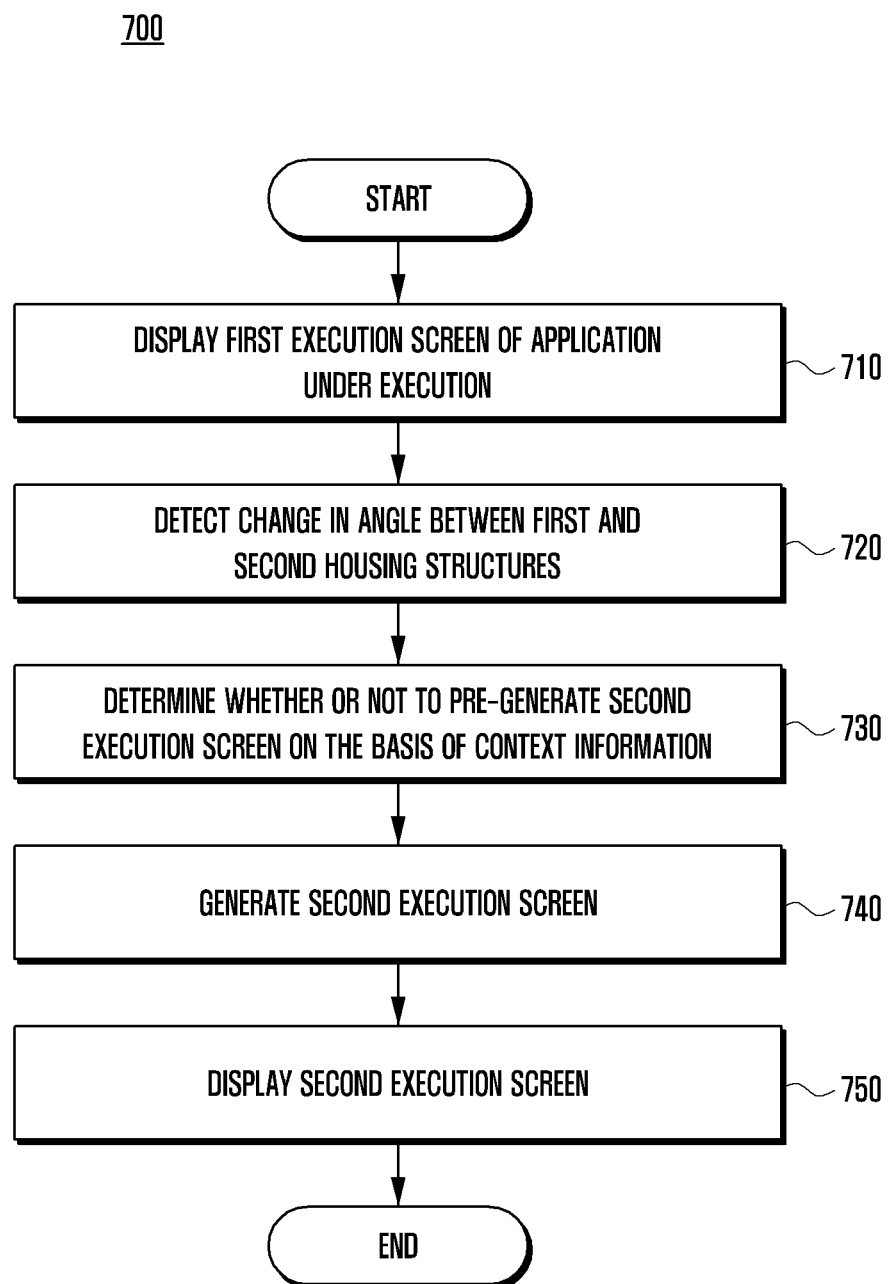
FIG. 7 is a flow chart illustrating a method of operating the electronic device according to certain embodiments of the disclosure.

FIG. 7 is a flow chart illustrating a method 700 of operating the electronic device according to certain embodiments of the disclosure.

According to certain embodiments of the disclosure, in process 710, the electronic device (e.g., the electronic device 200 of FIG. 6) may display the first execution screen of the application being executed (e.g., the first execution screen 550 of FIG. 5E).

According to certain embodiments of the disclosure, the first execution screen may refer to the execution screen of the application under execution which is displayed before the change in the state of the electronic device 200 (e.g., from the folded state to the unfolded state or from the unfolded state to the folded state).

According to certain embodiments of the disclosure, in process 720, the electronic device 200 may detect a change in an angle between the first housing structure (e.g., the first housing structure 210 of FIG. 5A) and the second housing structure (e.g., the second housing structure 220 of FIG. 5A).

According to certain embodiments of the disclosure, the electronic device 200 may be operatively connected to a sensor (not illustrated) that measures the angle between the first housing structure 210 and the second housing structure 220 (e.g., the angle 521 of FIG. 5C). The electronic device 200 may detect the angle between the first housing structure 210 and the second housing structure 220 on the basis of data received from the sensor.

According to certain embodiments of the disclosure, in process 730, the electronic device 200 may determine whether or not to pre-generate the second execution screen (e.g., the second execution screen 560 of FIG. 5F) on the basis of context information.

According to certain embodiments of the disclosure, the second execution screen 560 may refer to the execution screen of the application under execution which is displayed after the change in the state of the electronic device 200 (e.g., from the folded state to the unfolded state or from the unfolded state to the folded state). The second execution screen 560 may include content included in the first execution screen 550.

According to certain embodiments of the disclosure, previously generating the second execution screen may refer to generating the second execution screen before the change in the state of the electronic device 200 (e.g., the conversion from the folded state to the unfolded state) is completed.

According to certain embodiments of the disclosure, in process 740, the electronic device 200 may generate the second execution screen 560 in response to determining to pre-generate the second execution screen 560.

According to certain embodiments of the disclosure, in process 750, the electronic device 200 may display the second execution screen 560.

According to certain embodiments of the disclosure, the electronic device 200 may display the second execution screen 560 in response to detecting that the change in the angle between the first housing structure 210 and the second housing structure 220 is greater than or equal to a previously configured value.

Figure 8:
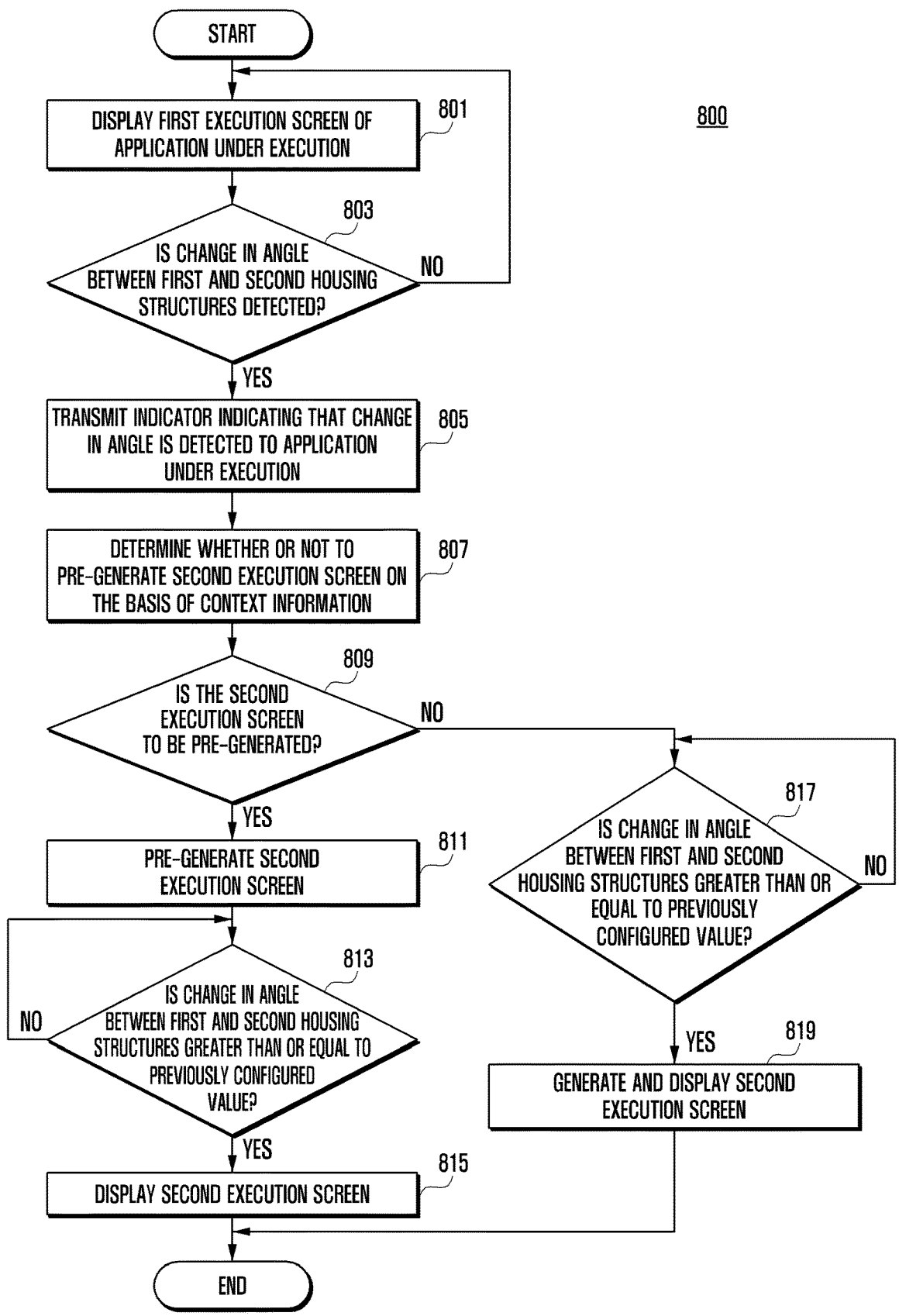
FIG. 8 is a flow chart illustrating a method of operating the electronic device according to certain embodiments of the disclosure.

FIG. 8 is a flow chart illustrating a method 800 of operating the electronic device according to certain embodiments of the disclosure.

According to certain embodiments of the disclosure, in process 801, the electronic device (e.g., the electronic device 200 of FIG. 6) may display the first execution screen of the application under execution (e.g., the first execution screen 550 of FIG. 5E).

According to certain embodiments of the disclosure, the first execution screen may refer to the execution screen of the application under execution which is displayed before the change in the state of the electronic device 200 (e.g., from the folded state to the unfolded state or from the unfolded state to the folded state).

According to certain embodiments of the disclosure, the electronic device 200 may display the first execution screen 550 on the first display 630 in a case where the electronic device 200 is in the unfolded state (e.g., the electronic device 200 of FIG. 5A). The processor 620 may display the first execution screen 550 on the second display 640 in a case where the electronic device 200 is in the folded state (e.g., the electronic device 200 of FIG. 5D).

According to certain embodiments of the disclosure, in process 803, the electronic device 200 may detect a change in an angle between the first housing structure (e.g., the first housing structure 210 of FIG. 5A) and the second housing structure (e.g., the second housing structure 220 of FIG. 5A).

According to certain embodiments of the disclosure, the electronic device 200 may be operatively connected to a sensor (e.g., the sensor 650 of FIG. 6) that measures the angle between the first housing structure 210 and the second housing structure 220 (e.g., the angle 521 of FIG. 5C). The electronic device 200 may detect the angle between the first housing structure 210 and the second housing structure 220 on the basis of data received from the sensor 650.

According to certain embodiments of the disclosure, the electronic device 200 may detect the angle between the first housing structure 210 and the second housing structure 220 using at least one sensor 650 that can detect a folding type of the electronic device 200 (e.g., a state in which the electronic device 200 is folded or a state in which the electronic device 200 is unfolded).

According to certain embodiments of the disclosure, the electronic device 200 may detect the angle between the first housing structure 210 and the second housing structure 220 using at least one sensor 660 that can detect a motion of the electronic device 200.

According to certain embodiments of the disclosure, in process 805, the electronic device 200 may transmit an indicator that indicates that the change in the angle to the application under execution in response to detecting the change in the angle between the first housing structure 210 and the second housing structure 220.

According to certain embodiments of the disclosure, in process 807, the electronic device 200 may determine whether or not to pre-generate the second execution screen (e.g., the second execution screen 560 of FIG. 5F) on the basis of context information.

According to certain embodiments of the disclosure, the second execution screen 560 may refer to the execution screen of the application under execution which is displayed after the change in the state of the electronic device 200 (e.g., from the folded state to the unfolded state or from the unfolded state to the folded state). The second execution screen 560 may include content included in the first execution screen 550.

According to certain embodiments of the disclosure, previously generating the second execution screen 560 may refer to generating the second execution screen 560 before the change in the state of the electronic device 200 (e.g., the conversion from the folded state to the unfolded state) is completed.

According to certain embodiments of the disclosure, the second execution screen 560 may be displayed on a display to be activated after the change in the state of the electronic device 200. The display to be activated may refer to a display on which content is to be displayed according to the change in the state of the electronic device 200 (e.g., the change from the folded state to the unfolded state or the change from the unfolded state to the folded state). For example, in the case where the electronic device 200 is changed from the folded state to the unfolded state, the first display 630 may be the display to be activated. For another example, in the case where the electronic device 200 is changed from the unfolded state to the folded state, the second display 640 may be the display to be activated.

According to certain embodiments of the disclosure, the context information may include information about the application under execution in the electronic device 200.

The information about the application under execution may refer to a weighted value relevant to a time taken to generate the execution screens (e.g., the first execution screen 550 and the second execution screen 560) of the application under execution. The electronic device 200 may determine whether or not to pre-generate the second execution screen on the basis of the weighted value corresponding to the application under execution.

According to certain embodiments of the disclosure, in a case where the weighted value corresponding to the application under execution is greater than or equal to (or exceeds) a previously configured value, the electronic device 200 may determine to pre-generate the second execution screen 560. In a case where the weighted value corresponding to the application under execution is smaller than (or smaller than or equal to) a previously configured value, the electronic device 200 may determine not to pre-generate the second execution screen 560.

According to certain embodiments of the disclosure, the context information may include may include a size which a task corresponding to the application under execution occupies on the memory 610. The task may refer to various jobs for performing a function which the application provides. The electronic device 200 may detect the size which the task occupies on the memory 610 in real time, and determine whether or not to pre-generate the second execution screen 560 on the basis of the size which the task occupies on the memory 610. For example, in a case where the size which the task occupies on the memory 610 is greater than or equal to a previously configured value, the electronic device 200 may determine to pre-generate the second execution screen 560. This is because, as the size which the task occupies on the memory 610 becomes greater, the time taken to generate the second execution screen 560 tends to increase.

According to certain embodiments of the disclosure, the context information may include information about the state of the electronic device 200. For example, the information about the state of the electronic device 200 may various pieces of information that include a state of a battery charge level of the electronic device 200, a state of communication of the electronic device 200, and information about the background applications that are under execution in the electronic device 200. In a case where the electronic device 200 determines the battery charge level, and the battery charge level is lower than or equal to a previously configured value, the electronic device 200 may determine not to pre-generate the second execution screen 560 for a reduction in battery consumption. In a case where the electronic device 200 determines the information about the background applications that are under execution in the electronic device 200, and a size which the background applications under execution occupy on the memory 610 is less than or equal to (or less than) a previously configured value, the electronic device 200 may determine to pre-generate the second execution screen 560.

According to certain embodiments of the disclosure, in process 809, the electronic device 200 may determine whether or not to pre-generate the second execution screen 560.

According to certain embodiments of the disclosure, in process 811, the electronic device (e.g., the electronic device 200 of FIG. 5) may generate the second execution screen 560 in response to detecting that the electronic device 200 determines to pre-generate the second execution screen 560.

According to certain embodiments of the disclosure, the electronic device 200 may pre-generate the second execution screen 560 in response to determining to pre-generate the second execution screen 560. The electronic device 200 may pre-generate the second execution screen 560 until the change in the state of the electronic device 200 (e.g., the conversion from the folded state to the unfolded state or the conversion from the unfolded state to the folded state) is completed.

According to certain embodiments of the disclosure, in process 813, the electronic device 200 may detect whether or not the change in the angle between the first housing structure 210 and the second housing structure 220 is greater than or equal to a previously configured value.

According to certain embodiments of the disclosure, the previously configured value may refer to a value by which the display of the screen is converted from the first display 530 to the second display 540 or a value by which the display of the screen is converted from the second display 540 to the first display 530, and may be changed according to an intent of a designer.

According to certain embodiments of the disclosure, in process 815, the electronic device 200 may display the second execution screen 560 in response to detecting that the change in the angle between the first housing structure 210 and the second housing structure 220 is greater than or equal to a previously configured value.

By previously generating the second execution screen 560 as in the processes described above, although the conversion of the state of the electronic device 200 (e.g., the conversion from the unfolded state to the folded state or the conversion from the folded state to the unfolded state) occurs, a time utilized until the displaying of the second execution screen 560 is started after the displaying of the first execution screen 550 is terminated can be minimized. By minimizing the time utilized until the displaying of the second execution screen 560 is started after the displaying of the first execution screen 550 is terminated, usefulness of the foldable device for a user can be increased.

According to certain embodiments of the disclosure, in process 817, the electronic device 200 may detect whether or not the change in the angle between the first housing structure 210 and the second housing structure 220 is greater than or equal to a previously configured value in response to detecting that the electronic device 200 determines not to pre-generate the second execution screen 560 in process 809.

According to certain embodiments of the disclosure, in process 819, the electronic device (e.g., the electronic device 200 of FIG. 5) may generate and display the second execution screen 560 in response to detecting that the change in the angle between the first housing structure 210 and the second housing structure 220 is greater than or equal to a previously configured value.

The method of operating the electronic device according to certain embodiments of the disclosure may include: a process of detecting a change in an angle between a first housing structure, which is connected to a hinge structure, and a second housing structure, which is connected to the hinge structure and is folded about the hinge structure onto the first housing structure while displaying a first execution screen of an application under execution in the electronic device; a process of determining whether or not to pre-generate a second execution screen to be displayed on a display to be activated in response to detecting the change in the angle on the basis of context information; a process of previously generating the second execution screen before the change in the angle is greater than or equal to a previously configured value in response to determining to generate the second execution screen; and a process of displaying the second execution screen on the display to be activated in response to detecting that the change in the angle is greater than or equal to a previously configured value.

In the method of operating the electronic device according to certain embodiments of the disclosure, the context information may include a size of data to be processed for execution of the application, and the process of determining whether or not to pre-generate a second execution screen may include determining whether or not to generate the second execution screen on the basis of the size of the data.

In the method of operating the electronic device according to certain embodiments of the disclosure, the context information may include information about content to be included in the second execution screen, and the process of determining whether or not to pre-generate a second execution screen may include determining whether or not to generate the second execution screen on the basis of the information about the content.

In the method of operating the electronic device according to certain embodiments of the disclosure, the context information may include a size which a task for execution of the application occupies on a memory, and the process of determining whether or not to pre-generate a second execution screen may include determining whether or not to generate the second execution screen on the basis of the size which the task occupies on the memory.

In the method of operating the electronic device according to certain embodiments of the disclosure, the process of determining whether or not to pre-generate a second execution screen may include a process of detecting a time utilized to generate the second execution screen, and a process of displaying a part of the second execution screen on a second display in a case where the detected time is greater than or equal to a previously configured value.

Figure 9:
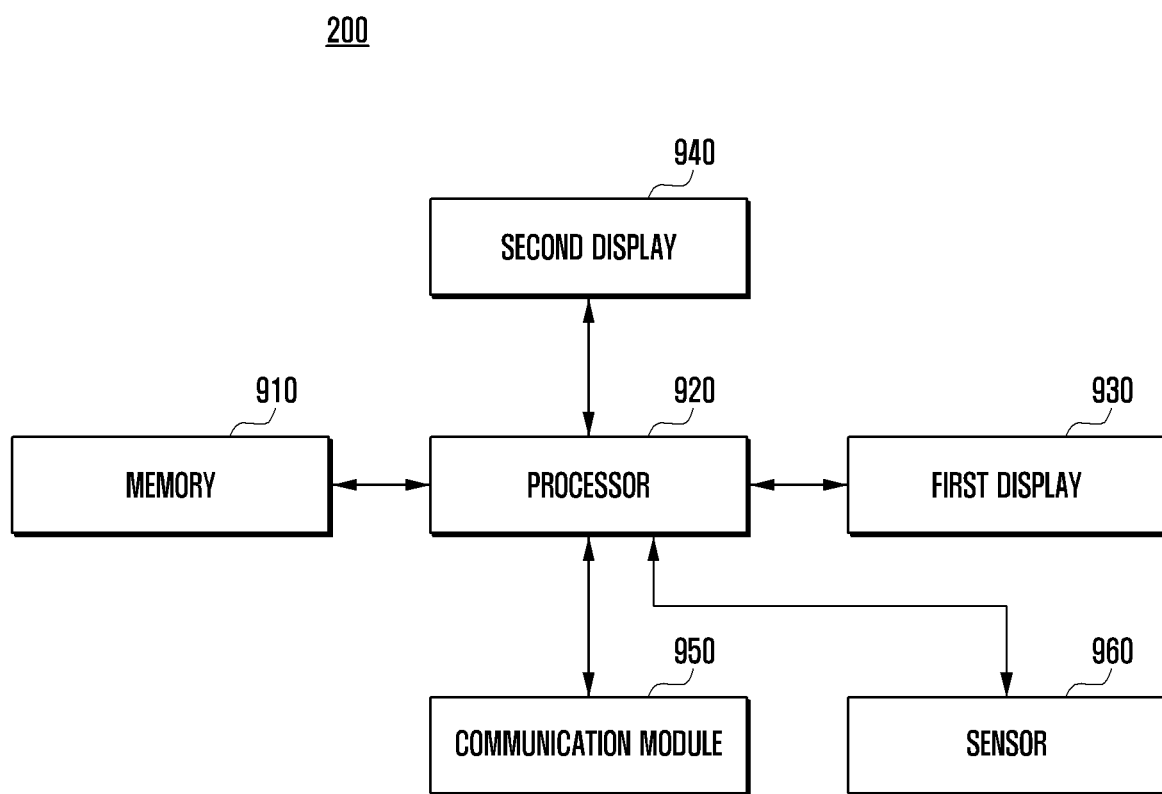
FIG. 9 is a block diagram of the electronic device according to certain embodiments of the disclosure.

FIG. 9 is a block diagram of the electronic device according to another embodiment of the disclosure.

Referring to FIG. 9, the electronic device (e.g., the electronic device 200 of FIG. 2A) according to certain embodiments of the disclosure may include a memory 910 (e.g., the memory 130 of FIG. 1), a processor 920 (e.g., the processor 120 of FIG. 1), a first display 930 (e.g., the display 160 of FIG. 1 or the first display 530 of FIG. 5A), a second display 940 (e.g., the display 160 of FIG. 1 or the second display 540 of FIG. 5B), a communication module 950 (e.g., the communication module 190 of FIG. 1), and a sensor 960.

According to certain embodiments of the disclosure, the first display 930 and the second display 940 may display various still or moving images on the basis of control of the processor 920. In the case where the electronic device 200 is in the unfolded state (e.g., the electronic device 200 of FIG. 5A), the processor 920 may display the various still or moving images on the first display 930. In the case where the electronic device 200 is in the folded state (e.g., the electronic device 200 of FIG. 5D), the processor 920 may display the various still or moving images on the second display 940.

According to certain embodiments of the disclosure, the first display 930 may have a larger size than the second display 940. A resolution which the first display 930 can support may be higher than that which the second display 940 can support.

According to certain embodiments of the disclosure, the memory 910 may be operatively connected to the processor 920, and may store instructions for operating the processor 920. The processor 920 may perform various operations using the instructions stored in the memory 910.

According to certain embodiments of the disclosure, the processor 920 may receive content having a first quality from an external server (e.g., the server 108 of FIG. 1) using the communication module 950. The content may include an image, a moving image, and a sound. In the case of the content having a format of the image or moving image, the processor 920 may output the content in a method of displaying the content using the first display 930 or the second display 940. In the case of the content having a sound format, the processor 920 may output the content using the speaker (e.g., the sound output unit 155 of FIG. 1). In the case of the content having the format of the image or moving image, the first quality may refer to an image quality. In the case of the content having the sound format, the first quality may refer to a sound quality.

According to certain embodiments of the disclosure, the processor 920 may detect a change in an angle between the first housing structure (e.g., the first housing structure 210 of FIG. 5A) and the second housing structure (e.g., the second housing structure 220 of FIG. 5A) while the content having a first quality is output. The change in the angle between the first housing structure 210 and the second housing structure 220 may be detected through various methods.

According to certain embodiments of the disclosure, the processor 920 may be operatively connected to the sensor 960 that measures the angle between the first housing structure 210 and the second housing structure 220 (e.g., the angle 521 of FIG. 5C). The processor 920 may detect the angle between the first housing structure 210 and the second housing structure 220 on the basis of data received from the sensor 960.

According to certain embodiments of the disclosure, the processor 920 may detect the angle between the first housing structure 210 and the second housing structure 220 using at least one sensor 960 (e.g., a Hall sensor) that can detect a folding type of the electronic device 200 (e.g., a state in which the electronic device 200 is folded or a state in which the electronic device 200 is unfolded).

According to certain embodiments of the disclosure, the processor 920 may detect the angle between the first housing structure 210 and the second housing structure 220 using at least one sensor 960 (e.g., a gyro sensor) that can detect a motion of the electronic device 200.

According to certain embodiments of the disclosure, the processor 920 may request another piece of content having a second quality different from the first quality from the external server 108 in response to detecting the angle between the first housing structure 210 and the second housing structure 220.

According to certain embodiments of the disclosure, in a case where a change state of the angle between the first housing structure 210 and the second housing structure 220 is detected and corresponds to a state converted from the folded state to the unfolded state, the processor 920 may request the other piece of the content having the higher second quality than the first quality from the external server 108.

According to certain embodiments of the disclosure, in the case of the content having the format of the image or moving image, the processor 920 may control the second display 940 such that the content is displayed on the second display 940 that can support an image quality higher than an image quality which the first display 930 can support in response to detecting that the electronic device 200 is converted from the folded state to the unfolded state.

According to certain embodiments of the disclosure, in the case of the content having the sound format, the processor 920 may change an audio codec from an audio codec that supports output of existing content to an audio codec that supports output of content having a higher sound quality in response to detecting that the electronic device 200 is converted from the folded state to the unfolded state.

According to certain embodiments of the disclosure, in a case where a change state of the angle between the first housing structure 210 and the second housing structure 220 is detected and corresponds to a state converted from the folded state to the unfolded state, the processor 920 may request the other piece of the content having the lower second quality than the first quality from the external server 108. In the case where the electronic device 200 is converted from the folded state to the unfolded state, the processor 920 may control the first display 930 such that the content is displayed on the first display 930 that can support an image quality lower than an image quality which the second display 940 can support.

According to certain embodiments of the disclosure, in the case of the content having the sound format, the processor 920 may change an audio codec from an audio codec that supports output of existing content to an audio codec that supports output of content having a lower sound quality in response to detecting that the electronic device 200 is converted from the unfolded state to the folded state.

According to certain embodiments of the disclosure, in a case where the angle between the first housing structure 210 and the second housing structure 220 is greater than or equal to (or exceeds) a previously configured value, the processor 920 may output the content having a second quality. In a case where, through the operations as described above, as the state of the electronic device 200 is changed (e.g., changed from the folded state to the unfolded state or from the unfolded state to the folded state), the component that supports the output of content is changed (e.g., changed from the first display 930 to the second display 940 or from the second display 940 to the first display 930), the electronic device 200 prevents a sharp change in quality which may be caused by a capability of the component that supports the output of content, and thereby can prevent a reduction in usefulness for a user.

The electronic device according to certain embodiments of the disclosure may include: a foldable housing that includes a hinge structure, a first housing structure that is connected to the hinge structure, and a second housing structure that is connected to the hinge structure and is folded about the hinge structure onto the first housing structure; a first display that includes a region bent in a state in which the first housing structure and the second housing structure are folded onto each other; a second display that is disposed on the first housing structure and/or the second housing structure and is disposed to face the first display; at least one sensor that is disposed in the foldable housing and is configured to detect a change in an angle between the first housing structure and the second housing structure; a communication module that is configured to transmit and/or receive a signal to and/or from an external server; a processor that is disposed in the first housing structure or the second housing structure and is operatively connected to the first display, the second display, the at least one sensor, and the communication module; and a memory that is operatively connected to the processor. When executed, the memory may store instructions to cause the processor to receive at least a piece of content having a first quality from the external server through the communication module, to detect the change in the angle between the first housing structure and the second housing structure using the at least one sensor while outputting the received content having a first quality, to request another piece of content having a second quality different from the first quality from the external server through the communication module in response to detecting that the change in the angle is greater than or equal to a previously configured value, and to output the other piece of the content having the second quality, which is received from the external server.

In the electronic device according to certain embodiments of the disclosure, in a case where the content is a moving image, each of the first quality and the second quality may be a quality relevant to a resolution of the moving image (e.g., the first and second qualities may reflect a first resolution and a second resolution higher than the first resolution). In a case where the content is a sound, each of the first quality and the second quality may be a quality relevant to a sound quality of the sound (e.g., the first quality and the second quality may reflect or include a first audio fidelity and a second audio fidelity higher than the first audio fidelity).

Figure 10A:
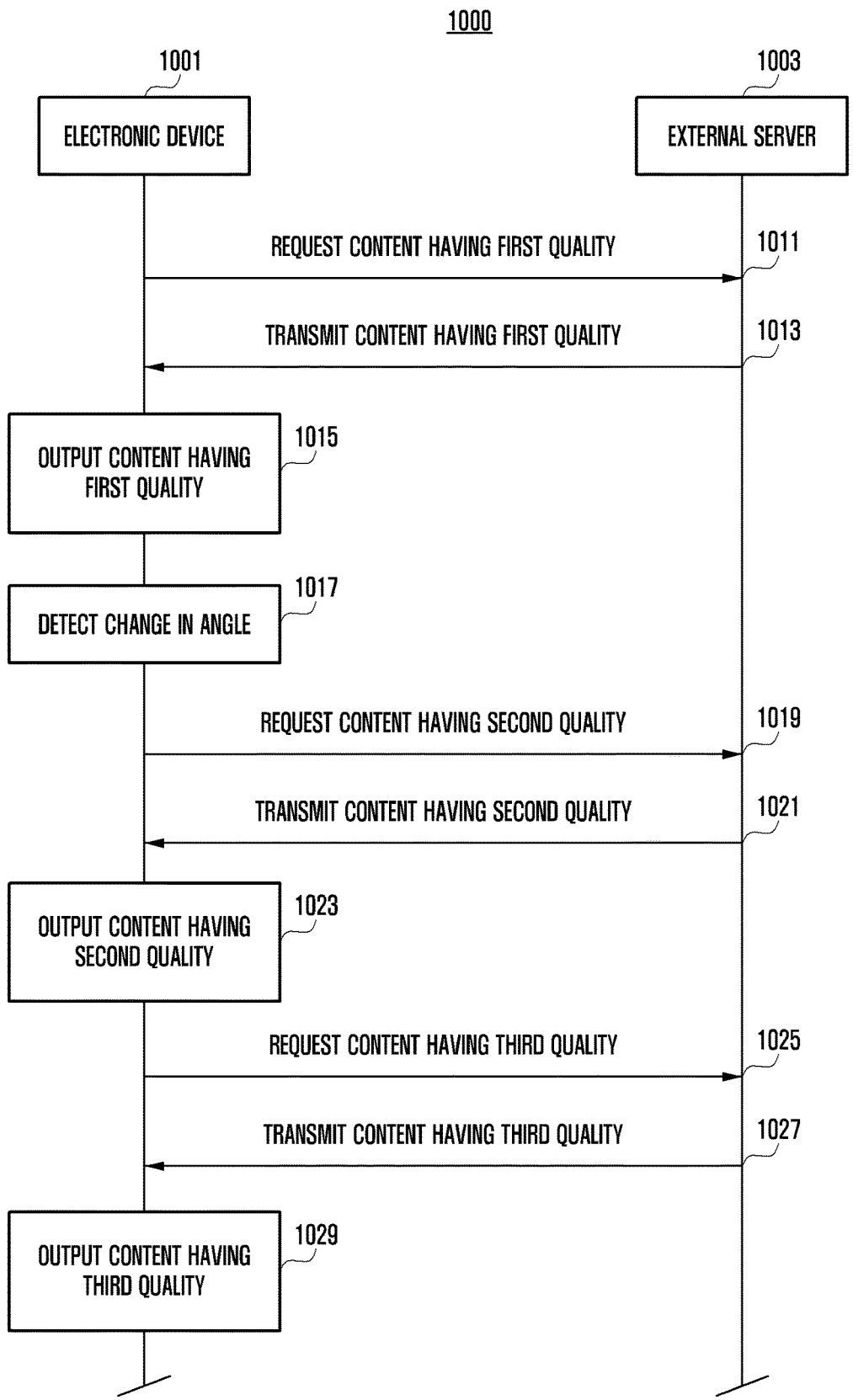
FIG. 10A is a diagram illustrating an example in which pieces of content different in quality from each other are output in the electronic device according to certain embodiments of the disclosure.

FIG. 10A is a diagram illustrating a method 1000 of outputting pieces of content different in quality from each other in the electronic device according to certain embodiments of the disclosure.

Referring to FIG. 10A, the electronic device 1001 (e.g., the electronic device 200 of FIG. 2A) according to certain embodiments of the disclosure may request at least a piece of content having a first quality from the external server 1003 in process 1011.

According to certain embodiments of the disclosure, in process 1013, the external server 1003 may transmit the at least piece of the content having the first quality to the electronic device 1001 in response of receiving a request signal which the electronic device 1001 transmits.

According to certain embodiments of the disclosure, in process 1015, the electronic device 1001 may output the at least piece of the content having the first quality, which the external server 1003 transmits. In the case of content having a format of a still or moving image, the electronic device 1001 may output the content in a method of displaying the content on the first display (e.g., the first display 930 of FIG. 9) or the second display (e.g., the second display 940 of FIG. 9). In the case of content having a sound format, the electronic device 1001 may output the content using the speaker (e.g., the sound output unit 155 of FIG. 1).

According to certain embodiments of the disclosure, in process 1017, the electronic device 1001 may detect a change in an angle between the first housing structure (e.g., the first housing structure 210 of FIG. 2A) and the second housing structure (e.g., the second housing structure 220 of FIG. 2A).

According to certain embodiments of the disclosure, in process 1019, the electronic device 1001 may request the external server 1003 to transmit another piece of content having a second quality.

According to certain embodiments of the disclosure, the second quality may be different from the first quality. In a case where a state of the change in the angle between the first housing structure 210 and the second housing structure 220 corresponds to a state in which the electronic device 200 is converted from the folded state to the unfolded state, the second quality may be higher than the first quality. In a case where a state of the change in the angle between the first housing structure 210 and the second housing structure 220 corresponds to a state in which the electronic device 200 is converted from the unfolded state to the folded state, the second quality may be lower than the first quality.

According to certain embodiments of the disclosure, in process 1021, the external server 1003 may transmit the content having a second quality to the electronic device 1001.

According to certain embodiments of the disclosure, the other piece of the content having the second quality may be some pieces that are temporally connected to the piece of the content having the first quality. The external server 1003 may store the pieces of content different in quality from each other for each of the same pieces of content, or may divide and store the pieces of content different in quality from each other for each previously configured section. For example, in a case where the content is a moving image having a playback length of one minute, the external server 1003 may divide the content into six moving images having a playback length of ten seconds (a moving image for 0 second to 10 seconds, a moving image for 11 seconds to 20 seconds, etc.), and store these moving images. A concrete example thereof will be described below in FIG. 10B.

According to certain embodiments of the disclosure, in process 1023, the electronic device 1001 may output the other piece of the content having the second quality, which are received from the external server 1003.

According to certain embodiments of the disclosure, in a state in which the electronic device 1001 displays the at least piece of the content having the first quality on the second display 940, the electronic device 1001 may display the other piece of the content having the higher second quality than the first quality on the first display 930.

According to certain embodiments of the disclosure, in a state in which the electronic device 1001 displays the at least piece of the content having the first quality on the first display 930, the electronic device 1001 may display the other piece of the content having the lower second quality than the first quality on the second display 940.

According to certain embodiments of the disclosure, in process 1025, the electronic device 1001 may request the external server 1003 to transmit another piece of content having a third quality.

According to certain embodiments of the disclosure, the third quality may be different from the first quality and the second quality. In a case where the state of the change in the angle between the first housing structure 210 and the second housing structure 220 corresponds to the state in which the electronic device 200 is converted from the folded state to the unfolded state, the third quality may be higher than the second quality. In a case where the state of the change in the angle between the first housing structure 210 and the second housing structure 220 corresponds to the state in which the electronic device 200 is converted from the unfolded state to the folded state, the third quality may be lower than the second quality.

According to certain embodiments of the disclosure, in process 1027, the external server 1003 may transmit the content having a third quality to the electronic device 1001.

According to certain embodiments of the disclosure, the other piece of the content having the third quality may be some pieces that are temporally connected to the piece of the content having the second quality.

According to certain embodiments of the disclosure, in process 1029, the electronic device 1001 may output the other piece of the content having the third quality, which are received from the external server 1003.

Figure 10B:
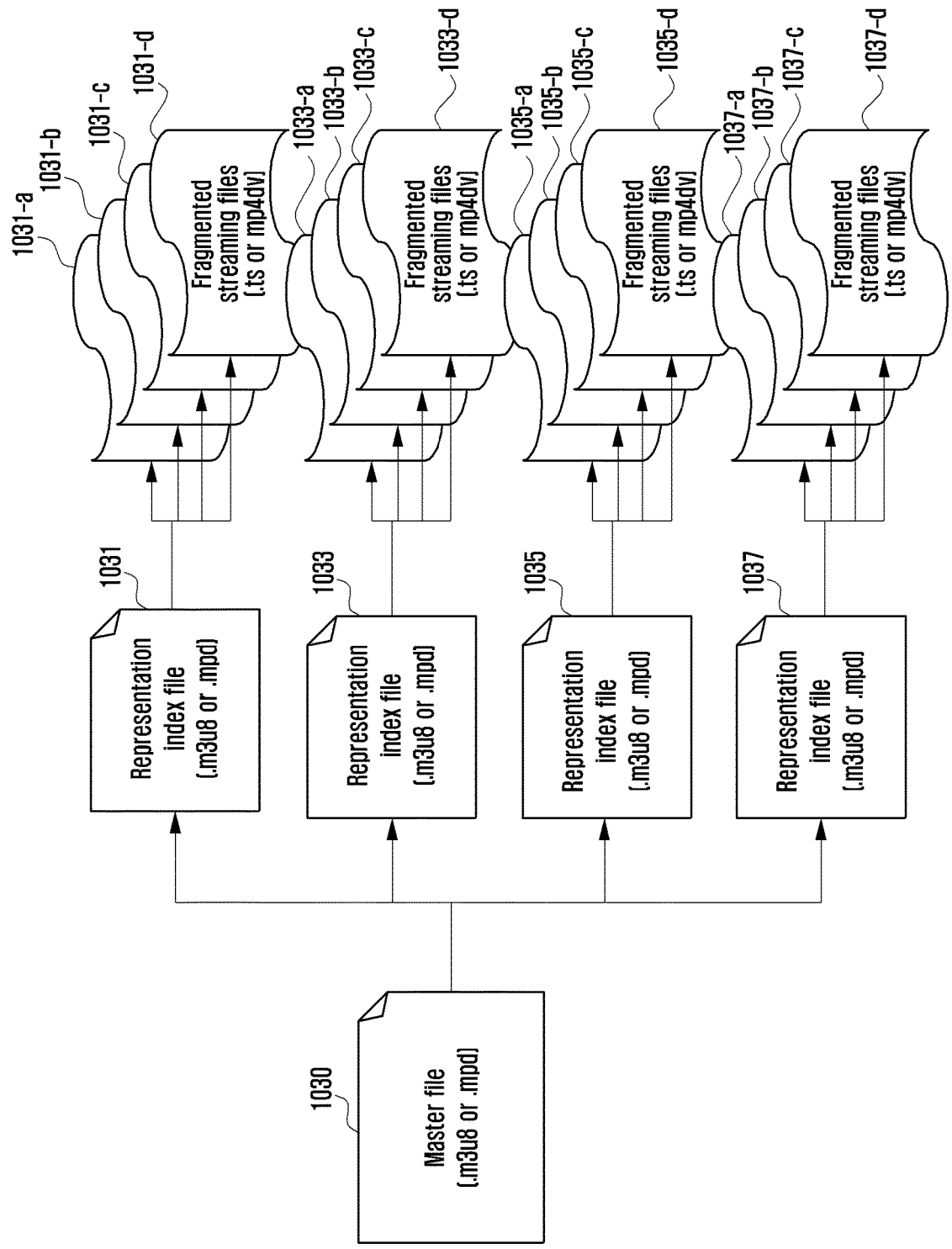
FIG. 10B is a diagram illustrating an example in which an external server for transmitting content to the electronic device according to certain embodiments of the disclosure stores pieces of content different in quality from each other.

FIG. 10B is a diagram illustrating an example in which an external server for transmitting content to the electronic device according to certain embodiments of the disclosure stores pieces of content different in quality from each other.

Referring to FIG. 10B, the external server (e.g., the external server 1003 of FIG. 10A) stores content 1030 to be transmitted to the electronic device (e.g., the electronic device 1001 of FIG. 10A).

According to certain embodiments of the disclosure, the external server 1003 may store pieces of content 1031, 1033, 1035, and 1037 having a plurality of qualities. For convenience of description, it is assumed that the external server 1003 can store the content 1031 having a first quality, the content 1033 having a second quality, the content 1035 having a third quality, and the content 1037 having a fourth quality. The plurality of pieces of content 1031, 1033, 1035, and 1037 may be the same pieces of content except that the qualities thereof are different from one another.

According to certain embodiments of the disclosure, each of the pieces of content 1031, 1033, 1035, and 1037 having a plurality of qualities may be divided at a previously configured time length. For example, the content 1031 having the first quality may be implemented by a plurality of pieces of content 1031-*a*, 1031-*b*, 1031-*c*, and 1031-*d* that are divided at a previously configured time length. The content 1033 having the second quality may be made up of a plurality of pieces of content 1033-*a*, 1033-*b*, 1033-*c*, and 1033-*d* that are divided at a previously configured time length. The content 1035 having the third quality may be implemented by a plurality of pieces of content 1035-*a*, 1035-*b*, 1035-*c*, and 1035-*d* that are divided at a previously configured time length. The content 1037 having the fourth quality may be made up of a plurality of pieces of content 1037-*a*, 1037-*b*, 1037-*c*, and 1037-*d* that are divided at a previously configured time length.

According to certain embodiments of the disclosure, the external server 1003 may transmit at least a piece 1031-*a* of the content having the first quality at the request of the electronic device 1001. The electronic device 1001 may detect the change in the angle between the first housing structure 210 and the second housing structure 220, and request the external server 1003 to transmit another piece 1033-*b* of the content having the second quality. In a case where, through the method as described above, as the state of the electronic device 1001 is changed (e.g., changed from the folded state to the unfolded state or from the unfolded state to the folded state), the component that supports the output of content is changed (e.g., changed from the first display 930 to the second display 940 or from the second display 940 to the first display 930), the electronic device 1001 prevents a sharp change in quality which may be caused by a capability of the component that supports the output of content, and supports a seamless screen transition, and can thereby prevent a reduction in usefulness for a user.

Figure 11:
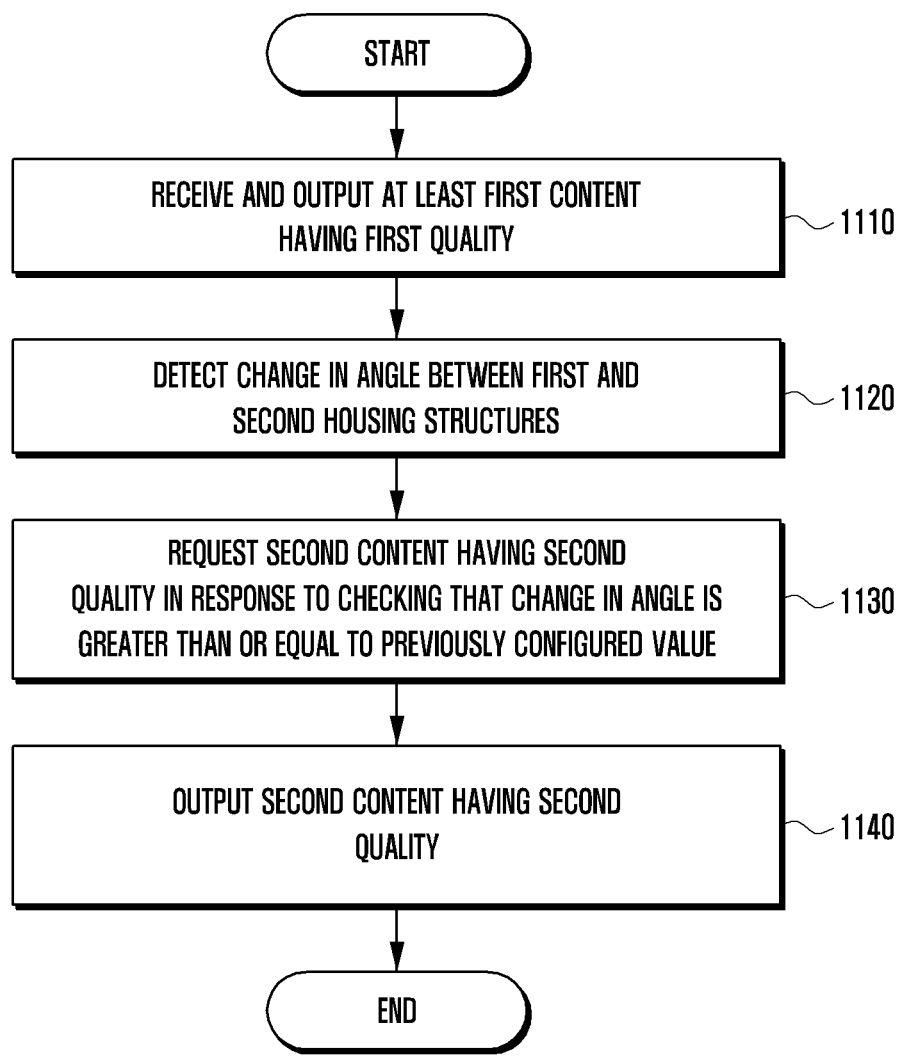
FIG. 11 is a flow chart illustrating a method of operating the electronic device according to certain embodiments of the disclosure.

FIG. 11 is a flow chart illustrating a method 1100 of operating the electronic device according to certain embodiments of the disclosure.

According to certain embodiments of the disclosure, in process 1110, the electronic device (e.g., the electronic device 1001 of FIG. 10A) may receive the at least piece of the content having the first quality (e.g., the at least piece 1031-*a* of the content having the first quality in FIG. 10B) from the external server (e.g., the external server 1003 of FIG. 10A), and output the at least piece 1031-*a* of the received content.

According to certain embodiments of the disclosure, in the case of content having a format of a still or moving image, the electronic device 1001 may output the content in a method of displaying the content on the first display (e.g., the first display 930 of FIG. 9) or the second display (e.g., the second display 940 of FIG. 9). In the case of content having a sound format, the electronic device 1001 may output the content using the speaker (e.g., the sound output unit 155 of FIG. 1).

According to certain embodiments of the disclosure, in process 1120, the electronic device 1001 may detect the change in the angle between the first housing structure 210 and the second housing structure 220.

According to certain embodiments of the disclosure, in process 1130, the electronic device 1001 may request the other piece of the content having the second quality (e.g., the other piece 1033-*b* of the content having the second quality in FIG. 10B) from the external server 1003 in response to detecting that the change in the angle between the first housing structure 210 and the second housing structure 220 is greater than or equal to a previously configured value.

According to certain embodiments of the disclosure, the second quality may be different from the first quality. In the case where the state of the change in the angle between the first housing structure 210 and the second housing structure 220 corresponds to the state in which the electronic device 200 is converted from the folded state to the unfolded state, the second quality may be higher than the first quality. In the case where the state of the change in the angle between the first housing structure 210 and the second housing structure 220 corresponds to the state in which the electronic device 200 is converted from the unfolded state to the folded state, the second quality may be lower than the first quality.

According to certain embodiments of the disclosure, the external server 1003 may transmit the other piece 1033-*b* of the content having the second quality to the electronic device 1001.

According to certain embodiments of the disclosure, the other piece 1033-*b* of the content having the second quality may be a piece that is temporally connected to the piece 1031-*a* of the content having the first quality. The external server 1003 may store the pieces of content 1031, 1033, 1035, and 1037 different in quality from each other for each of the same pieces of content, or may divide and store the pieces of content 1031, 1033, 1035, and 1037 different in quality from each other for each previously configured section. For example, in a case where the content is a moving image having a playback length of one minute, the external server 1003 may divide the content into six moving images having a playback length of ten seconds (a moving image for 0 second to 10 seconds, a moving image for 11 seconds to 20 seconds, etc.), and store these moving images.

According to certain embodiments of the disclosure, in process 1140, the electronic device 1001 may output the other piece 1033-*b* of the content having the second quality.

According to certain embodiments of the disclosure, in a state in which the electronic device 1001 displays the at least piece of the content having the first quality on the second display 940, the electronic device 1001 may display the other piece of the content having the higher second quality than the first quality on the first display 930.

According to certain embodiments of the disclosure, in a state in which the electronic device 1001 displays the at least piece of the content having the first quality on the first display 930, the electronic device 1001 may display the other piece of the content having the lower second quality than the first quality on the second display 940.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated with reference to various example embodiments, it will be understood that the various example embodiments are intended to be illustrative, not limiting. One of ordinary skill in the art will understand that various changes in form and details may be made without departing from the disclosure, as set forth, for example, in the appended claims and equivalents.

What is claimed is:

1. An electronic device, comprising:
a foldable housing including a hinge structure, a first housing structure connected to the hinge structure, and a second housing structure connected to the hinge structure and foldable about the hinge structure onto the first housing structure;
a first display disposed on at least part of a surface of the first housing structure and on at least part of a surface of the second housing structure;
a second display disposed on at least part of an opposite surface of the first housing structure and/or the second housing structure;
at least one sensor configured to detect a change in an angle between the first housing structure and the second housing structure;
a processor operatively coupled to the first display, the second display, and the at least one sensor; and
a memory that is operatively coupled to the processor, storing instructions, and at least one application,
wherein the instructions are executable by the processor to cause the electronic device to:
display a first execution screen of an application on an activated display among the first and second displays;
while the first execution screen is displayed on the activated display among the first and second displays, pre-generate a second execution screen in response to detecting the change in the angle; and
activate, among the first and second displays, another display that has been deactivated and display the pre-generated second execution screen on the another display when the angle is greater than a predetermined threshold value.

2. The electronic device of claim 1, wherein the instructions are further executable by the processor to cause the electronic device to:
when determining not to pre-generate the second execution screen based on context information relevant to the application, generate the second execution screen in response to detecting that the change in the angle is greater than or equal to the predetermined threshold value, and display the generated second execution screen on the first display.

3. The electronic device of claim 1, wherein the instructions are further executable by the processor to cause the electronic device to:
complete generation of the second execution screen when the change in the angle is greater than or equal to the predetermined threshold value.

4. The electronic device of claim 1, wherein the memory stores context information relevant to the application, and
the context information includes a file size of data to be processed for execution of the application, and
wherein the instructions are further executable by the processor to cause the electronic device to: determine whether to generate the second execution screen based on the file size of the data.

5. The electronic device of claim 1, wherein the memory stores context information relevant to the application, and
the context information includes content to be included in the second execution screen; and
wherein the instructions are further executable by the processor to cause the electronic device to: determine whether to generate the second execution screen based on the content.

6. The electronic device of claim 1, wherein:
the memory is configured to store a task for execution of the application and context information relevant to the application;
the context information includes a file size indicating a portion of the memory occupied by the stored task; and
wherein the instructions are further executable by the processor to cause the electronic device to: determine whether to generate the second execution screen based on the file size indicating the portion of the memory occupied by the stored task.

7. The electronic device of claim 1, wherein the memory stores a context information relevant to the application, and
the context information includes a time required to complete generation of the second execution screen; and
wherein the instructions are further executable by the processor to cause the electronic device to: determine whether or not to generate the second execution screen based on the time.

8. The electronic device of claim 1, wherein the first execution screen includes at least some of content included in the second execution screen.

9. An electronic device, comprising:
a foldable housing including a hinge structure, a first housing structure connected to the hinge structure, and a second housing structure connected to the hinge structure and foldable about the hinge structure onto the first housing structure;
a display disposed on at least part of a surface of the first housing structure and at least part of a surface of the second housing structure;
at least one sensor disposed in the foldable housing and configured to detect a change in an angle between the first housing structure and the second housing structure;

a processor operatively coupled to the display and the at least one sensor; and a memory that is operatively coupled to the processor, storing instructions, at least one application, and wherein the instructions are executable by the processor to cause the electronic device to:

display a first execution screen of an application on a first region of the display; application for display on a partial region of the display;

while the first execution screen of the application is displayed on the first region of the display, pre-generate a second execution screen in response to detecting the change in the angle; and display the second execution screen on the first region and a second region of the display when the change in the angle is greater than or equal to a predetermined threshold value.

10. The electronic device of claim 9, wherein the memory stores context information relevant to the application, the context information includes a file size of data to be processed for execution of the application; and wherein the instructions are further executable by the processor to cause the electronic device to: determine whether to generate the second execution screen based on the file size of the data.

11. The electronic device of claim 9, wherein the memory stores context information relevant to the application, the context information includes content to be included in the second execution screen; and wherein the instructions are further executable by the processor to cause the electronic device to: determine whether to generate the second execution screen based on the content.

12. The electronic device of claim 9, wherein:

the memory is configured to store a task for execution of the application and a context information relevant to the application;

the context information includes a file size indicating a portion of the memory occupied by the stored task; and wherein the instructions are further executable by the processor to cause the electronic device to: determine whether to generate the second execution screen based on the file size indicating the portion of the memory occupied by the stored task.

13. The electronic device of claim 9, wherein the first execution screen includes at least some of content included in the second execution screen.

14. A method for an electronic device comprising a foldable housing including a hinge structure, a first housing structure connected to the hinge structure, and a second housing structure connected to the hinge structure and foldable about the hinge structure onto the first housing structure; and a display disposed on at least part of a surface of the first housing structure and at least part of a surface of the second housing structure, said method comprising:

displaying a first execution screen of an application on the display disposed on at least part of the surface of the first housing structure and on at least part of the surface of the second housing structure and wherein an opposite surface of the first housing structure is folded towards the opposite surface of the second housing structure;

while the first execution screen of the application is displayed on the display, pre-generating the second execution screen prior in response to detecting a change in an angle between the first housing structure and the second housing structure; and displaying the second execution screen on the display when the change in the angle is greater than or equal to a predetermined threshold value.

15. The method of claim 14, wherein the method further comprising determining whether to generate the second execution screen based on a file size of data to be processed for execution of the application.

16. The method of claim 14, wherein the method further comprising determining whether to generate the second execution screen based on content to be included in the second execution screen.

17. The method of claim 14, wherein the method further comprising determining whether to generate the second execution screen based on a file size indicating a portion of a memory occupied by a stored task.

18. The method of claim 14, wherein the method further comprises:

checking a time required to generate the second execution screen; and displaying a part of the first execution screen on a second display when the checked time is greater than or equal to a predetermined time threshold.

* * * * *